United States Patent
Sivakumar et al.

(10) Patent No.: US 8,976,742 B2
(45) Date of Patent: Mar. 10, 2015

(54) SYSTEMS AND METHODS FOR ACHIEVING HIGH DATA-RATE WIRELESS COMMUNICATION

(75) Inventors: Raghupathy Sivakumar, Alpharetta, GA (US); Sandeep Kakumanu, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 990 days.

(21) Appl. No.: 13/014,499

(22) Filed: Jan. 26, 2011

(65) Prior Publication Data

US 2011/0182260 A1    Jul. 28, 2011

Related U.S. Application Data

(60) Provisional application No. 61/298,383, filed on Jan. 26, 2010.

(51) Int. Cl.
*H04W 4/00* (2009.01)
*H04W 28/06* (2009.01)
*H04W 72/00* (2009.01)
*H04W 72/12* (2009.01)
*H04W 74/08* (2009.01)

(52) U.S. Cl.
CPC .............. *H04W 28/06* (2013.01); *H04W 72/00* (2013.01); *H04W 72/12* (2013.01); *H04W 74/0808* (2013.01)
USPC ............ 370/329; 370/330; 370/331; 370/332

(58) Field of Classification Search
CPC .................................................... H04W 28/04
USPC ......................................... 370/341, 348, 329
See application file for complete search history.

(56) References Cited

U.S. PATENT DOCUMENTS

| 6,845,090 | B1 | 1/2005 | Takabatake et al. |
| 7,046,649 | B2 * | 5/2006 | Awater et al. ................. 370/338 |
| 7,197,335 | B2 | 3/2007 | Lau |
| 7,583,645 | B2 | 9/2009 | Qi et al. |
| 7,606,243 | B2 | 10/2009 | Takabatake et al. |
| 7,626,931 | B2 | 12/2009 | Wu et al. |

(Continued)

OTHER PUBLICATIONS

Kakumanu, Sandeep et al., "Glia: A Practical Solution for Effective High Datarate Wifi-Arrays", MobiCom 09, Sep. 20-25, Beijing, China, 12 pages.

*Primary Examiner* — Brandon Renner
*Assistant Examiner* — Abdelnabi Musa
(74) *Attorney, Agent, or Firm* — Troutman Sanders LLP; Ryan A. Schneider; Dustin B. Weeks

(57) ABSTRACT

An embodiment of the present invention provides a system for increasing aggregate throughput in a wireless network array comprising a first node and a second node. The first node comprises a first plurality of wireless radios, a scheduling module, and an adaptive carrier sensing module. The second node can comprise a second plurality of wireless radios. The first node can be configured to simultaneously wirelessly transmit a first data packet from the first wireless radio in the first plurality of wireless radios to a first wireless radio in the second plurality of wireless radios at a first frequency and wirelessly transmit a second data packet from a second wireless radio in the first plurality of wireless radios to a second wireless radio in the second plurality of wireless radios at a second frequency, wherein the first frequency and second frequency are in a predetermined frequency band.

17 Claims, 17 Drawing Sheets

(56) References Cited

U.S. PATENT DOCUMENTS

| | | |
|---|---|---|
| 2008/0117864 A1 | 5/2008 | Wu et al. |
| 2009/0061849 A1* | 3/2009 | Yang et al. .................. 455/426.1 |
| 2009/0088177 A1 | 4/2009 | Yang et al. |
| 2009/0232026 A1 | 9/2009 | Lu |
| 2010/0246542 A1* | 9/2010 | Orth ............................... 370/338 |
| 2010/0246549 A1* | 9/2010 | Zhang et al. ................... 370/338 |
| 2010/0309872 A1* | 12/2010 | Amini et al. ................... 370/329 |
| 2013/0010694 A1* | 1/2013 | Yu et al. ......................... 370/328 |

* cited by examiner

INPUT:
*isIdle* = Variable indicating if all radios are idle
*recvAddr* = Address of the receiver
*snoopAddr*[$i$] = Src and Dst addresses of opportunistic snooped packets, $i = 1$ to $k$, $k$ = Total number of addresses
OUTPUT:
*isSend* = Variable requesting to send packets to recvAddr
ALGORITHM
1  If (*isIdle* == 1) {
2    if (*recvAddr* != *snoopAddr*[$i$] $\wedge$ $i = 1$ to $k$)
3      *isSend* = 1;
4    else *isSend* = 0; }

Figure 6

DEFINITION: $epoch$ = a period of time when radios in a
wifi-array send out packets.
INPUT: $RSSI[i]$ = Current RSSI of radio $i$, $i = 1$ to $n$
$CSthresh$ = RSSI threshold for default Carrier Sense
$aCSthresh[i]$ = RSSI threshold, for radio $i$, for ACS,
using estimated RSSI of collocated transmissions
OUTPUT: $oPkt[i]$ = Packet of suitable size to send on radio $i$
$isSendPkt[i]$ – 1 if $oPkt[i]$ should be sent in this epoch,
0 otherwise
VARIABLES: $isFree[i]$ – 1 if channel $i$ is free
ALGORITHM:
1  for ($i = 1$ to $n$)
2    if ($RSSI[i] < CSthresh$) $isFree[i] = 1$
3  for ($i = 1$ to $n$) {
4    if ($RSSI[i] < aCSthresh[i]$) {
5      create $oPkt[i]$ of suitable size
6      send $oPkt[i]$ on radio $i$ } }

Figure 7

INPUT: $rate[i]$ = Datarate for radio $i$, $i = 1$ to $n$
$iPkt[id]$ = Higher layer packets, $id$ = packet number
OUTPUT: $oPkt[i]$ = Glia Packet for radio $i$
GLIA PACKET FORMAT:
|Header|Segment|Header|Segment|...|Header|Segment|
Segment = segment of bytes of some $iPkt[j]$
Where, Header = $(pnum, length, offset, more)$
$pnum = j$, input packet number
$length$ = length of $iPkt[j]$ bytes used in this segment
$offset$ = Location of the first byte of Segment in the $iPkt[j]$
$more$ = 0 if this segment contains the last byte of $iPkt[j]$,
   1 otherwise
VARIABLES USED: $pSize[i]$ = size of Glia packet on radio $i$
$tTime[i]$ = transmission time for Glia packet on radio $i$
ALGORITHM:
1 Convert all $iPkt[id]$ into one single byte stream
2 find $k$ such that $rate[k]$ is maximum $\forall\ i$
3 $pSize[k]$ = MTU
4 Choose $pSize[i]\ \forall\ i\ !=\ k$ such that $tTime[i] = tTime[k]$
5 Take ($pSize[i]$ - Header size) bytes from byte stream,
   add Headers and create Glia packet

Figure 8

SYSTEMS AND METHODS FOR ACHIEVING HIGH DATA-RATE WIRELESS COMMUNICATION

CROSS-REFERENCE TO RELATED APPLICATIONS

This application claims the benefit of U.S. Provisional Application Ser. No. 61/298,383, filed 26 Jan. 2010, which is incorporated herein by reference in its entirety as if fully set forth below.

TECHNICAL FIELD OF THE INVENTION

The various embodiments of the present disclosure relate generally to wireless communication systems and methods. More particularly, the various embodiments of the present invention are directed to systems and methods for achieving high data-rate wireless communication.

BACKGROUND OF THE INVENTION

The speed at which data can be transmitted wirelessly has significantly increased over the past few years. Even with the advancements made in wireless data technologies, however, there still remains a need to continue to bridge the bandwidth gap that exists between wire-line and wireless data networks. Wireless networks using IEEE 802.11 (a, g, or n) standards have considerably improved data-rates in Wireless Local Area Networks ("WLANs"). These standards, however, have provisions that would allow multiple orthogonal channels to be used by different networks operating in the same vicinity simultaneously. The orthogonality of the channels allows the channels to be used simultaneously both in time and space without the concern of interference. Similarly, other wireless standards such as Bluetooth, WiMax, IEEE 802.15.4 (Zigbee) etc also allow for multiple orthogonal channels to be used. Thus, systems and methods that could make use of the multiple orthogonal channels could greatly increase the throughput in wireless networks. Unfortunately, conventional systems have not been able to make efficient use of the available orthogonal channels to achieve high data-rates.

If a wireless network array has two wireless nodes each having N radios capable of transmitting and receiving data Y Mbps, then that network has could ideally have a throughput of N×Y Mbps. For example, if each wireless node has 12 collocated radios corresponding to 12 channels in the 5.2 GHz frequency band, and each channel has a throughput capability of 40 Mbps, then the wireless network could ideally have an aggregate throughput of about 480 Mbps (40 Mbps×12 channels=480 Mbps) when all channels are used simultaneously to transmit and receive data. The actual throughput of such conventional systems, however, is about 70 Mbps, which is merely 15% of the ideal throughput. FIG. 1 illustrates variations in the aggregate throughput of conventional systems as a function of the number of simultaneous links active at the same time as compared to the ideal throughput of such conventional systems.

Two phenomena, which both pertain to the close physical proximity of the collocated wireless radios in the wireless network array, cause the unexpected performance degradation in conventional Wi-Fi array systems. First, Out-Of-Band ("OOB") emission of energy at a transmitting radio is strong enough at relatively short distances that it can trigger carrier sensing at a nearby collocated radio operating on an orthogonal channel and also corrupt the reception of packets at the other radios if they are receiving. Second, filter inefficiencies, which occurs when two radios in close proximity are operating on orthogonal channels, also increases the effective bit error rates and further lowers performance.

Thus, there is a desire for devices that use the multiple orthogonal channels in wireless networks simultaneously to realize a high data-rate wireless link and, hence, cater to applications requiring high bandwidths. For example, given that there are 3 orthogonal wireless channels in the 2.4 GHz band and 12 orthogonal wireless channels in the 5.2 GHz band, there is a desire for a pair of devices, each equipped with 15 wireless radios, capable of using all the available orthogonal channels simultaneously to achieve a high data-rate wireless link. Further, there is a desire for these systems and methods capable of implementation as a software module that works with any off-the-shelf wireless radios, thus requiring minimal to no changes to the hardware or firmware of the radios themselves.

BRIEF SUMMARY OF THE INVENTION

The present invention relates to systems and methods for achieving high data-rate wireless communication. An exemplary embodiment of the present invention provides a system for increasing aggregate throughput in a wireless network array, the system comprising a first node comprising a first plurality of wireless radios and a second node comprising a second plurality of wireless radios, wherein the first node is configured to simultaneously wirelessly transmit a first data packet from the first wireless radio in the first plurality of wireless radios to a first wireless radio in the second plurality of wireless radios at a first frequency and wirelessly transmit a second data packet from a second wireless radio in the first plurality of wireless radios to a second wireless radio in the second plurality of wireless radios at a second frequency, wherein the first frequency and second frequency are in a predetermined frequency band. In some embodiments of the system for increasing aggregate throughput in a wireless network array, the aggregate throughput of data transmitted from the first node to the second node can exceed 70% of the sum of the default individual throughputs of each channel used to transmit data.

In an exemplary embodiment of the system for increasing aggregate throughput in a wireless network array, the first node further comprises a scheduling module configured to prevent each radio in the first plurality of wireless radios from transmitting data packets when any other wireless radio in the first plurality of wireless radios is receiving data packets. In some embodiments of the system for increasing aggregate throughput in a wireless network array, the scheduling module also prevents the first node from transmitting data packets to the second node when the second node is receiving data packets from a third node.

In another exemplary embodiment of the system for increasing aggregate throughput in a wireless network array, the first node further comprises an adaptive carrier sensing module to estimate and account for the out-of-band emission power created by a first wireless radio in the first plurality of wireless radios when the first wireless radio is transmitting data packets. In some embodiments of the system for increasing aggregate throughput in a wireless network array, the adaptive carrier sensing module also inserts a delay time between the start of the first data packet transmission from the first wireless radio in the first plurality of wireless radios and the start of the second data packet transmission from the second wireless radio in the first plurality of wireless radios. In some embodiments of the system for increasing aggregate throughput in a wireless network array, the adaptive carrier sensing module also determines whether a channel of each wireless radio in the first plurality of wireless radios is free.

In yet another exemplary embodiment of the system for increasing aggregate throughput in a wireless network array, the first node further comprises a coarse synchronization module to ensure that the first data packet transmission, the second data packet transmission, and acknowledgements occur within a predetermined epoch.

In still yet another exemplary embodiment of the system for increasing aggregate throughput in a wireless network array, the first node further comprises a framing module to progressively decrease the size of each data packet being transmitted in successive data packet transmissions.

In even still yet another exemplary embodiment of the system for increasing aggregate throughput in a wireless network array, the first node further comprises an efficiency module to select a combination of adjacent channels used to transmit the first and second data packets such that aggregate throughput of the system is increased.

In addition to systems for increasing aggregate throughput in a wireless network array, the present invention relates to methods of increasing aggregate throughput in a wireless network array. An exemplary embodiment of the present invention provides a method of increasing aggregate throughput in a wireless network array. The method comprises providing a first node comprising a first plurality of wireless radios, providing a second node comprising a second plurality of wireless radios, and simultaneously wirelessly transmitting a first data packet from a first wireless radio in the first plurality of wireless radios to a first wireless radio in the second plurality of wireless radios at a first frequency and wirelessly transmitting a second data packet from a second wireless radio in the first plurality of wireless radios to a second wireless radio in the second plurality of wireless radios at a second frequency, wherein the first frequency and second frequency are in a predetermined frequency band. In some embodiments of the method of increasing aggregate throughput in a wireless network array, the aggregate throughput of data transmitted from the first node to the second node exceeds 70% of the sum of the default individual throughputs of each channel used to transmit data.

In an exemplary embodiment of the method of increasing aggregate throughput in a wireless network array, the first node further comprises a scheduling module to prevent each radio in the first plurality of wireless radios from transmitting data packets when any other wireless radio in the first plurality of wireless radios is receiving data packets. In some embodiments of the method of increasing aggregate throughput in a wireless network array, the scheduling module also prevents the first node from transmitting data packets to the second node when the second node is receiving data packets from a third node.

In another exemplary embodiment of the method of increasing aggregate throughput in a wireless network array, the first node further comprises a coarse synchronization module to ensure that successive data packet transmissions and acknowledgements occur within a predetermined epoch.

In yet another exemplary embodiment of the method of increasing aggregate throughput in a wireless network array, the first node further comprises a framing module to progressively decrease the size of each data packet being transmitted in the successive data packet transmissions.

In still yet another exemplary embodiment of the method of increasing aggregate throughput in a wireless network array, the first node further comprises an adaptive carrier sensing module to estimate and account for the out-of-band emission power created by a first wireless radio in the first plurality of wireless radios when the first wireless radio is transmitting data packets. In some embodiments of the method of increasing aggregate throughput in a wireless network array, the adaptive carrier sensing module also inserts a delay time between the start of the first data packet transmission from the first wireless radio in the first plurality of wireless radios and the start of the second data packet transmission from the second wireless radio in the first plurality of wireless radios.

These and other aspects of the present invention are described in the Detailed Description below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. While one or more embodiments may be discussed as having certain advantageous features, one or more of such features may also be used with the various embodiments of the invention discussed herein. In similar fashion, while exemplary embodiments may be discussed below as system or method embodiments, it is to be understood that such exemplary embodiments can be implemented in various devices, systems, and methods of the present invention.

BRIEF DESCRIPTION OF DRAWINGS

The following Detailed Description of preferred embodiments is better understood when read in conjunction with the appended drawings. For the purposes of illustration, there is shown in the drawings exemplary embodiments. The subject matter, however, is not limited to the specific elements and instrumentalities disclosed. In the drawings:

FIG. 6 provides exemplary pseudo code for a scheduling module in an exemplary embodiment of the present invention.

FIG. 7 provides exemplary pseudo code for a coarse synchronization module in an exemplary embodiment of the present invention.

FIG. 8 provides exemplary pseudo code for a framing module in an exemplary embodiment of the present invention.

DETAILED DESCRIPTION OF THE INVENTION

To facilitate an understanding of the principles and features of the present invention, various illustrative embodiments are explained below. In particular, the invention is described in the context of being system and methods for increasing aggregate throughput in a wireless network. Embodiments of the present invention may be applied to systems or methods for transmitting data via wireless arrays. Embodiments of the invention, however, are not limited to use in systems and methods for transmitting data via wireless protocols described herein. As those of ordinary skill in the art would understand, embodiments of the invention can be used by any systems or methods for transmitting data wirelessly, including, but not limited to, IEEE 802.11 protocols, MIMO systems and methods, and the like. Potential applications of this invention include, but are not limited to, enterprise network deployments, wireless backhaul for wireless mesh networks, wireless video delivery networks for home or otherwise, and the like. Additionally, the systems and methods described herein may be used for long range or short range data transmission. Those skilled in the art will understand that the term "simultaneously," as used herein, includes near simultaneously and at about the same time. Further, although some of the embodiments described herein are in the context of the 2.4 GHz and 5.2 GHz frequency bands, embodiments of the present invention can be applied to all frequency bands including, but not limited to, the High Frequency ("HF") band, the Very High Frequency ("VHF") band, the Ultra High Frequency ("UHF") band, the Long wave ("L") band, the Short wave ("S") band, the C band, the X band, the Kurz-Under ("$K_u$") band, the Kurz ("K") band the Kurz-Above ("$K_a$") band, the "V" band the "W" band, the millimeter ("mm") band, and similar frequency bands.

The components described hereinafter as making up various elements of the invention are intended to be illustrative and not restrictive. Many suitable components or steps that would perform the same or similar functions as the components or steps described herein are intended to be embraced within the scope of the invention. Such other components or steps not described herein can include, but are not limited to, for example, similar components or steps that are developed after development of the invention.

Figure 1:
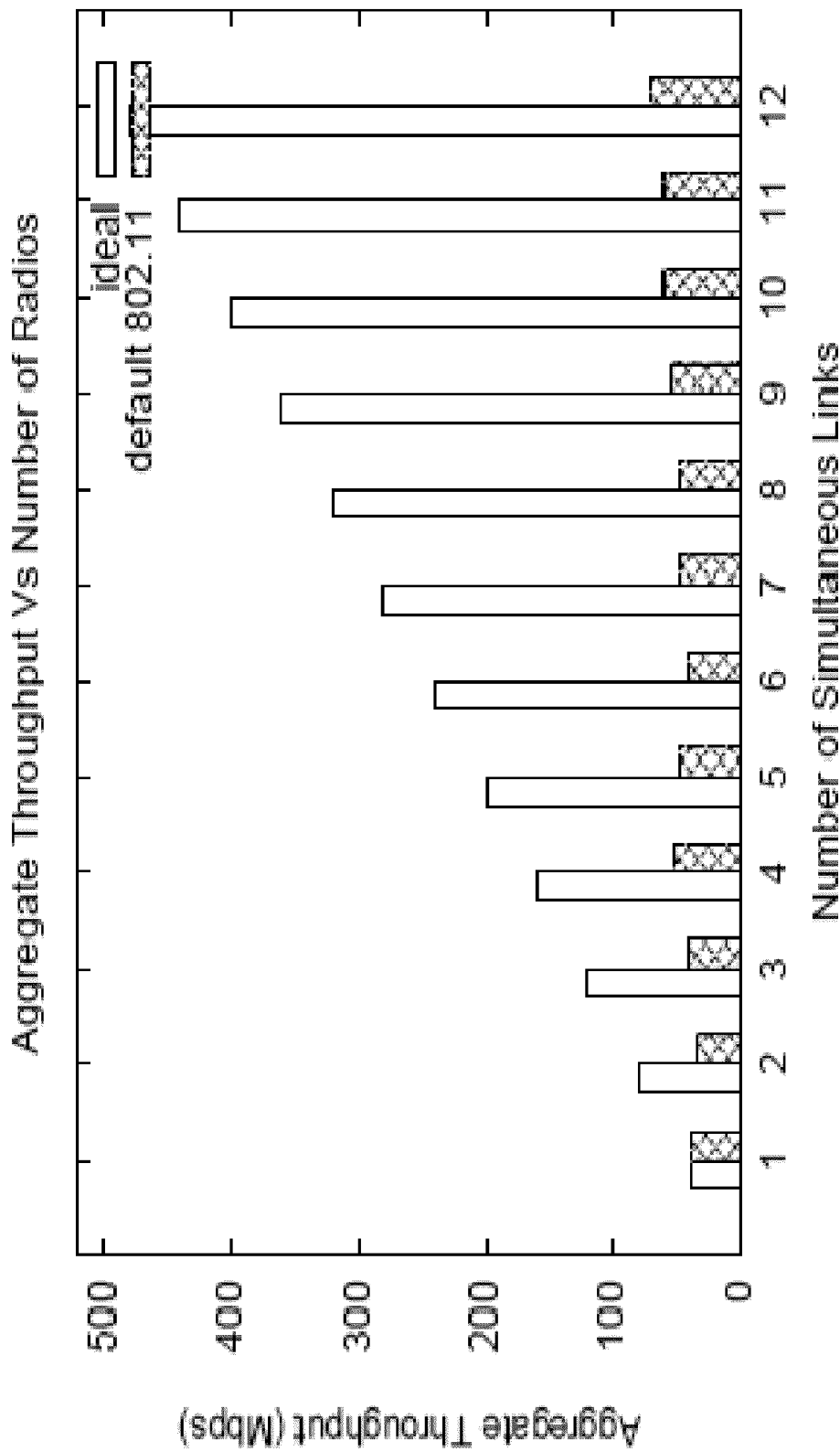
FIG. 1 illustrates variations in the aggregate throughput of conventional systems as a function of the number of simultaneous links active at the same time as compared to the ideal throughput of such conventional systems.
Figure 2:
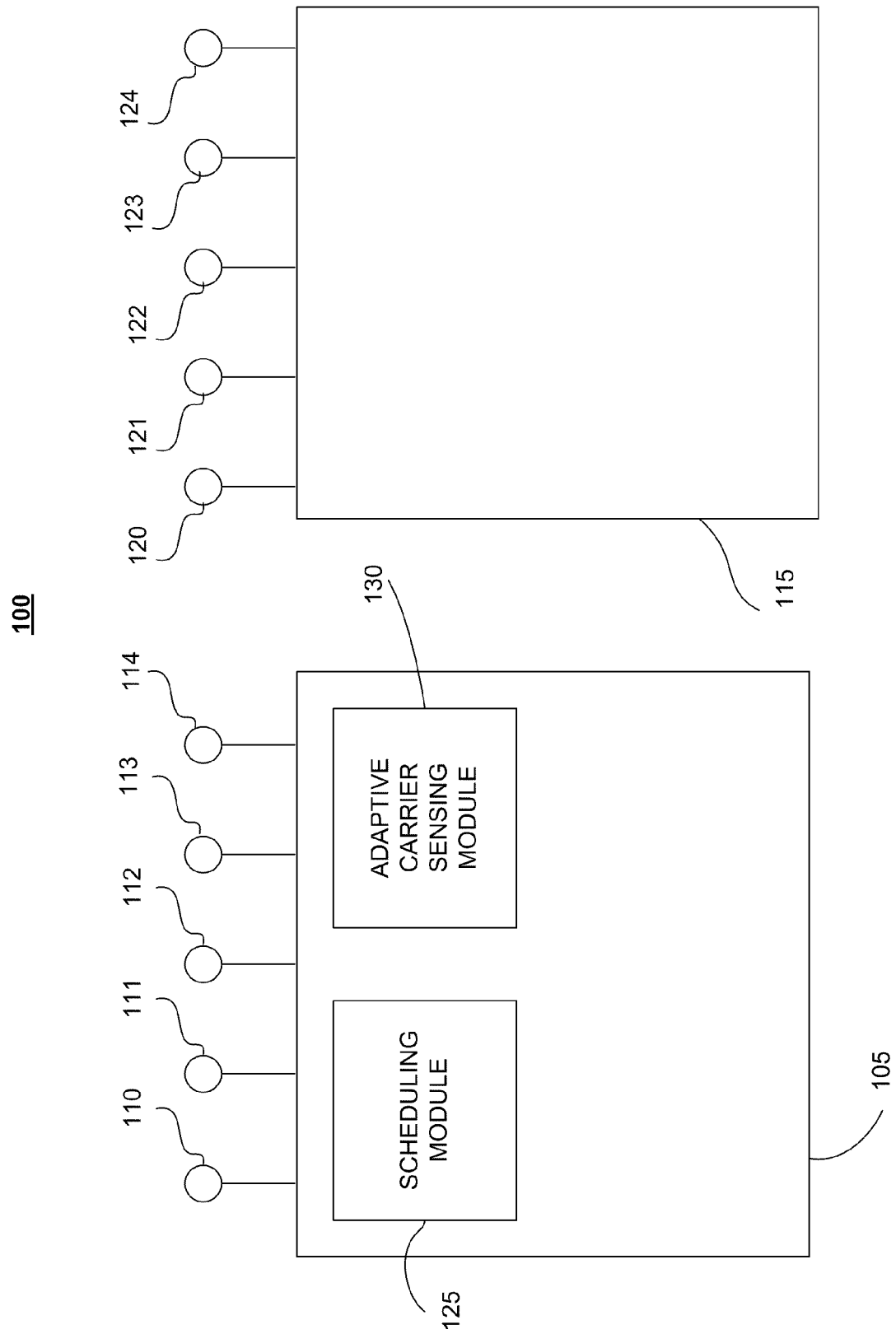
FIG. 2 provides an exemplary embodiment of a system for increasing aggregate throughput in a wireless network array.

An exemplary embodiment of the present invention provides a system 100 for increasing aggregate throughput in a wireless network array. FIG. 2 provides an exemplary embodiment of a system 100 for increasing aggregate throughput in a wireless network array. The system 100 can comprise a first node 105 and a second node 105. In the exemplary embodiment, the first node 105 can comprise a first plurality of wireless radios 110, 111, 112, 113, and 114, a scheduling module 125, and an adaptive carrier sensing module 130. The second node 115 can comprise a second plurality of wireless radios 120, 121, 122, 123, and 124. In the exemplary embodiment of the system 100, the first node can be configured to simultaneously wirelessly transmit a first data packet from a first wireless radio 110 in the first plurality of wireless radios to a first wireless radio 120 in the second plurality of wireless radios at a first frequency and wirelessly transmit a second data packet from a second wireless radio 111 in the first plurality of wireless radios to a second wireless radio 121 in the second plurality of wireless radios at a second frequency. In another exemplary embodiment, the first node can further simultaneously wirelessly transmit a third data packet from a third wireless radio 112 in the first plurality of wireless radios to a third wireless radio 122 in the second plurality of wireless radios at a third frequency. In yet another exemplary embodiment, the first node can simultaneously transmit up to a number of data packets equal to the number of wireless radios in the first plurality of wireless radios. In some embodiments of the present invention, the first frequency and the second frequency are in a predetermined frequency band. In an exemplary embodiment of the system 100, the first frequency and second frequency are in the 2.4 GHz frequency band. In yet another exemplary embodiment of the system 100, the first and second frequency are in the 5.2 GHz frequency band. In still yet another embodiment of the system 100, the first frequency and the second frequency are any one of the following frequency bands, including, but not limited to, the High Frequency ("HF") band, the Very High Frequency ("VHF") band, the Ultra High Frequency ("UHF") band, the Long wave ("L") band, the Short wave ("S") band, the C band, the X band, the Kurz-Under ("$K_u$") band, the Kurz ("K") band the Kurz-Above ("$K_a$") band, the "V" band the "W" band, the millimeter ("mm") band, and similar frequency bands. In still yet another embodiment of the system 100, the second frequency is between 80% and 120% of the first frequency, but the second frequency is not equal to the first frequency. In even still yet another exemplary embodiment of the system 100, the second frequency is between 90% and 110% of the first frequency, but the second frequency is not equal to the first frequency.

Figure 3:
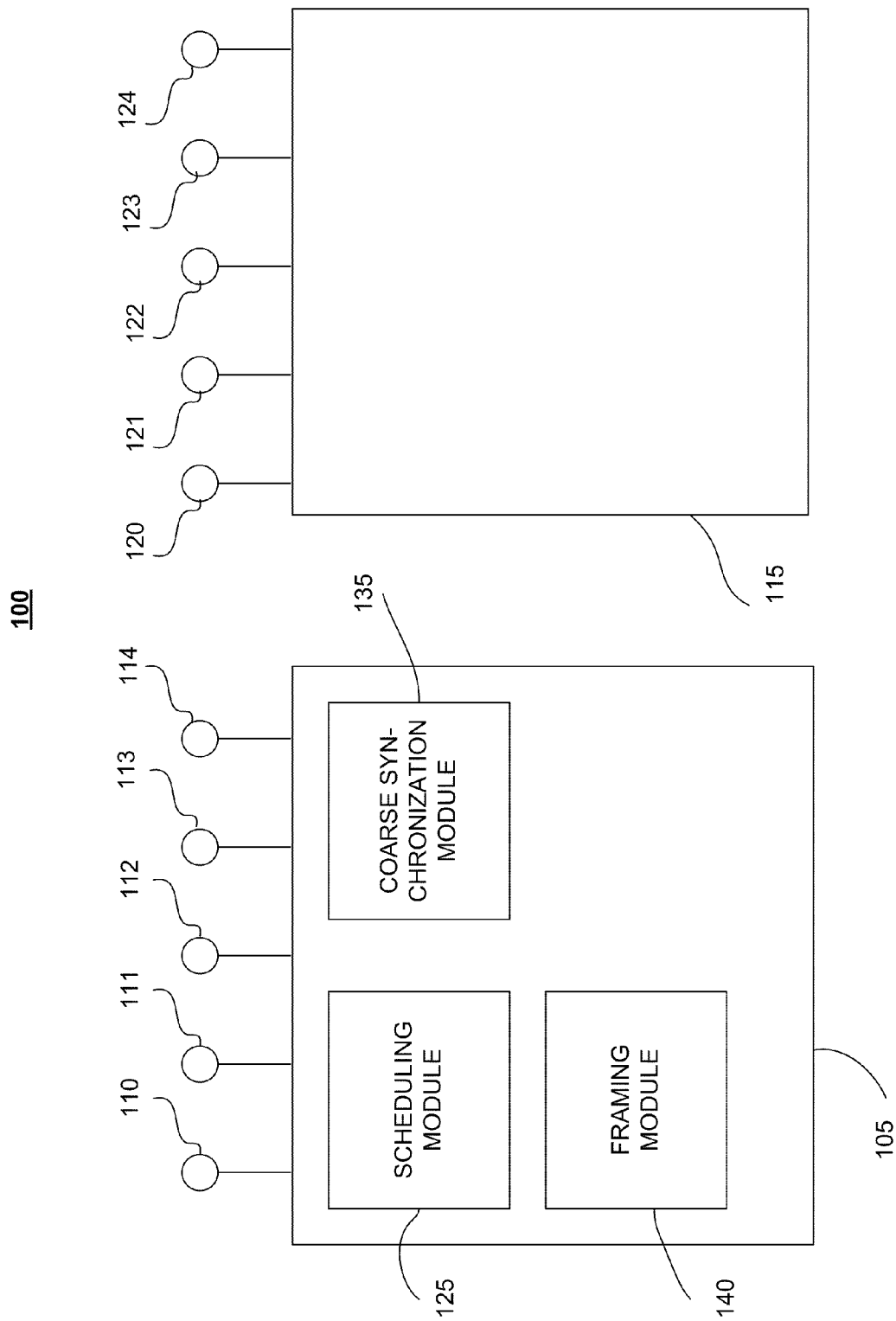
FIG. 3 provides another exemplary embodiment of a system for increasing aggregate throughput in a wireless network array.

FIG. 3 provides another exemplary embodiment of a system 100 for increasing aggregate throughput in a wireless network array. The exemplary system can comprise a first node 105 and a second node 105. In the exemplary embodiment, the first node can comprise a first plurality of wireless radios 110, 111, 112, 113, and 114, a scheduling module 125, a coarse synchronization module 135, and a framing module 140. The second node 115 can comprise a second plurality of wireless radios 120, 121, 122, 123, and 124. In the exemplary embodiment of the system 100, the first node 105 can be configured to simultaneously wirelessly transmit a first data packet from a first wireless radio 110 in the first plurality of wireless radios to a first wireless radio 120 in the second plurality of wireless radios at a first frequency and wirelessly transmit a second data packet from a second wireless radio 111 in the first plurality of wireless radios to a second wireless radio 121 in the second plurality of wireless radios at a second frequency. In another exemplary embodiment, the first node can further simultaneously wirelessly transmit a third data packet from a third wireless radio 112 in the first plurality of wireless radios to a third wireless radio 122 in the second plurality of wireless radios at a third frequency. In yet another exemplary embodiment, the first node can simultaneously transmit up to a number of data packets equal to the number of wireless radios in the first plurality of wireless radios. In some embodiments of the present invention, the first frequency and the second frequency are in a predetermined frequency band. In an exemplary embodiment of the system 100, the first frequency and second frequency are in the 2.4 GHz frequency band. In yet another exemplary embodiment of the system 100, the first and second frequency are in the 5.2 GHz frequency band. In still yet another embodiment of the system 100, the first frequency and the second frequency are any one of the following frequency bands, including, but not limited to, the High Frequency ("HF") band, the Very High Frequency ("VHF") band, the Ultra High Frequency ("UHF") band, the Long wave ("L") band, the Short wave ("S") band, the C band, the X band, the Kurz-Under ("$K_u$") band, the Kurz ("K") band the Kurz-Above ("$K_a$") band, the "V" band the "W" band, the millimeter ("mm") band, and similar frequency bands. In still yet another embodiment of the system 100, the second frequency is between 80% and 120% of the first frequency, but the second frequency is not equal to the first frequency. In even still yet another exemplary embodiment of the system 100, the second frequency is between 90% and 110% of the first frequency, but the second frequency is not equal to the first frequency.

Figure 4:
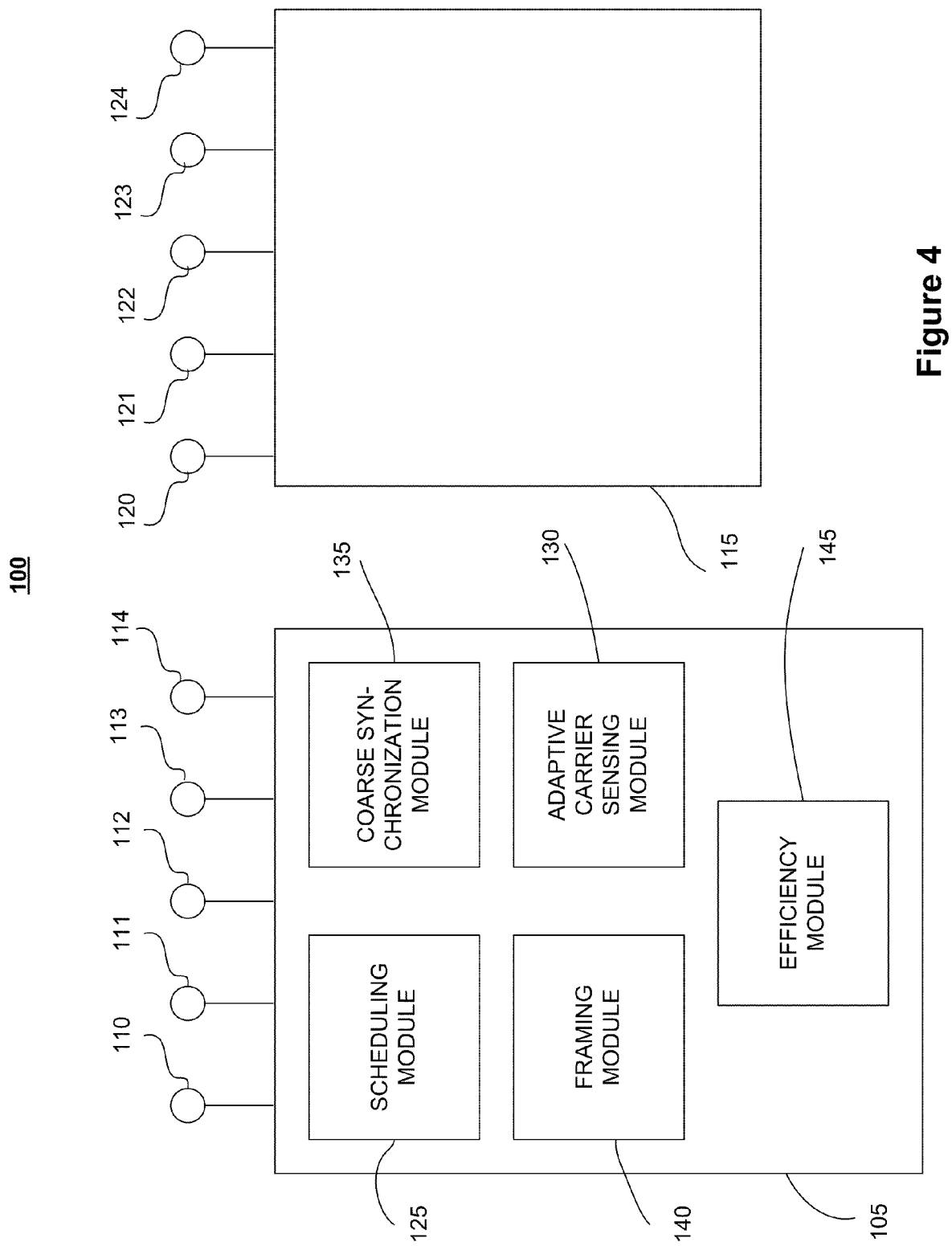
FIG. 4 provides yet another exemplary embodiment of a system for increasing aggregate throughput in a wireless network array.

FIG. 4 provides yet another exemplary embodiment of a system 100 for increasing aggregate throughput in a wireless network array. The exemplary system can comprise a first node 105 and a second node 105. In the exemplary embodiment, the first node 105 can comprise a first plurality of wireless radios 110, 111, 112, 113, and 114, a scheduling module 125, an adaptive carrier sensing module 130, a coarse synchronization module 135, a framing module 140, and an efficiency module 145. The second node 115 can comprise a second plurality of wireless radios 120, 121, 122, 123, and 124. In the exemplary embodiment, the first node can be configured to simultaneously wirelessly transmit a first data packet from a first wireless radio 110 in the first plurality of wireless radios to a first wireless radio 120 in the second plurality of wireless radios at a first frequency and wirelessly transmit a second data packet from a second wireless radio 121 in the first plurality of wireless radios to a second wireless radio 111 in the second plurality of wireless radios at a second frequency. In another exemplary embodiment, the first node can further simultaneously wirelessly transmit a third data packet from a third wireless radio 112 in the first plurality of wireless radios to a third wireless radio 122 in the second plurality of wireless radios at a third frequency. In yet another exemplary embodiment, the first node can simultaneously transmit up to a number of data packets equal to the number of wireless radios in the first plurality of wireless radios. In some embodiments of the present invention, the first frequency and the second frequency are in a predetermined frequency band. In an exemplary embodiment of the system 100, the first frequency and second frequency are in the 2.4 GHz frequency band. In yet another exemplary embodiment of the system 100, the first and second frequency are in the 5.2 GHz frequency band. In still yet another embodiment of the system 100, the first frequency and the second frequency are any one of the following frequency bands, including, but not limited to, the High Frequency ("HF") band, the Very High Frequency ("VHF") band, the Ultra High Frequency ("UHF") band, the Long wave ("L") band, the Short wave ("S") band, the C band, the X band, the Kurz-Under ("$K_u$") band, the Kurz ("K") band the Kurz-Above ("$K_a$") band, the "V" band the "W" band, the millimeter ("mm") band, and similar frequency bands. In still yet another embodiment of the system 100, the second frequency is between 80% and 120% of the first frequency, but the second frequency is not equal to the first frequency. In even still yet another exemplary embodiment of the system 100, the second frequency is between 90% and 110% of the first frequency, but the second frequency is not equal to the first frequency.

Although the exemplary embodiments of the first node 105 in FIGS. 2, 3, and 4 comprise five wireless radios 110, 111, 112, 113, and 114, the first plurality of wireless radios can comprise any number of wireless radios. In an exemplary embodiment, the first plurality of wireless radios 110, 111, 112, 113, and 114 are collocated. In another exemplary embodiment of the present invention, each wireless radio in the first plurality of wireless radios is within one meter of another radio in the first plurality of wireless radios. Further, although the exemplary embodiments of the second node 115 in FIGS. 2, 3, and 4 comprise five wireless radios 110, 111, 112, 113, and 114, the second plurality of wireless radios can comprise any number of wireless radios. In an exemplary embodiment, the second plurality of wireless radios 110, 111, 112, 113, and 114 are collocated. In another exemplary embodiment of the present invention, each wireless radio in the second plurality of wireless radios is within one meter of another wireless radio in the second plurality of wireless radios.

Figure 5:
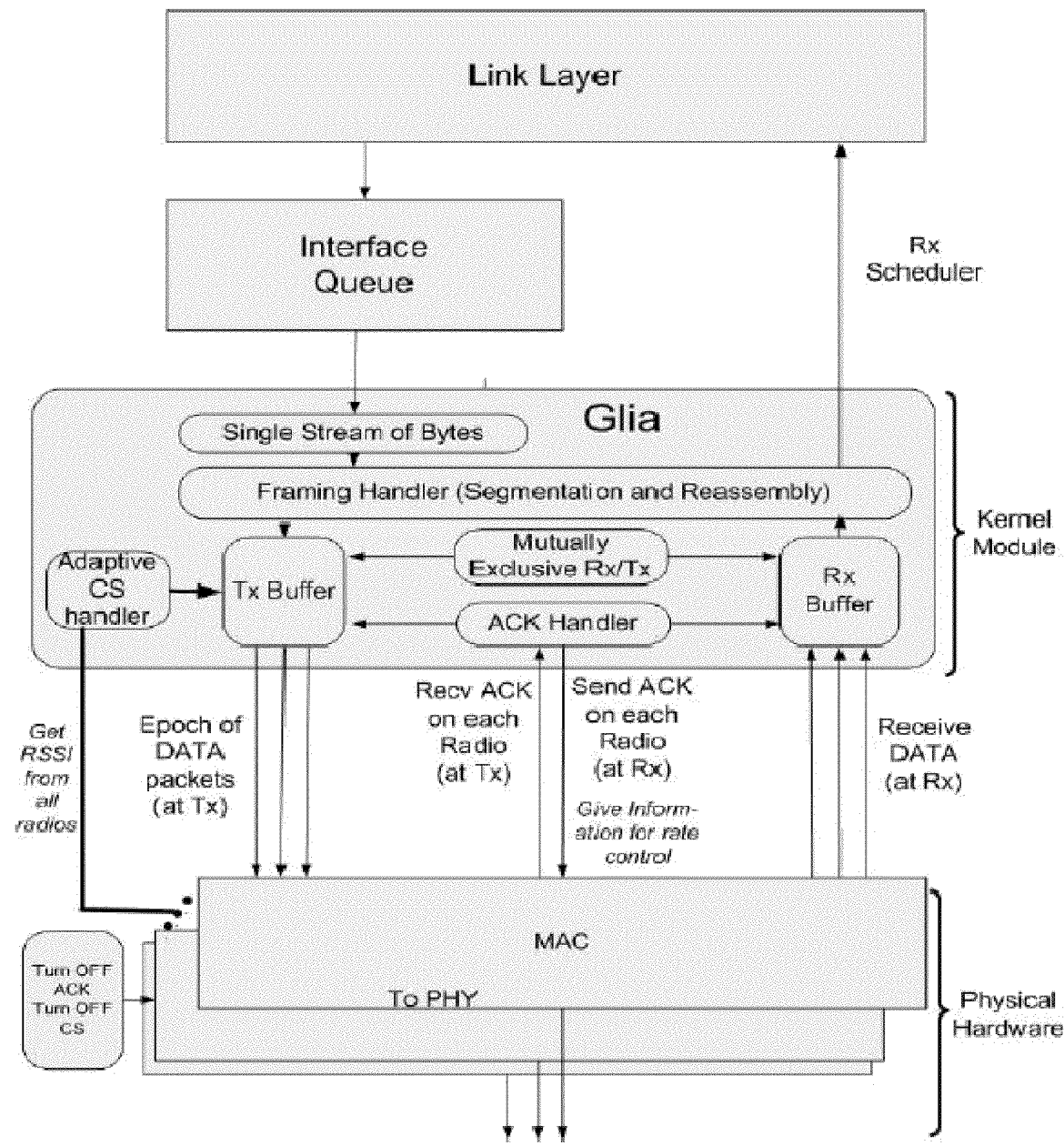
FIG. 5 provides exemplary software architecture of a software module in an exemplary embodiment of the present invention.

In some embodiments of the present invention, the scheduling module 125, adaptive carrier sensing module 130, coarse synchronization module 135, and framing module 140 can be implemented as a software module 500. FIG. 5 provides exemplary software architecture of the software module 500 in an exemplary embodiment of the present invention. In some embodiments, the software module 500 is capable of implementation with off-the-shelf wireless radios. In some embodiments of the present invention the software module 500 is a 2.5 layer solution between the link layer and the medium access layer. In some embodiments of the present invention, correct operation of software module 500 can use the following from the 802.11 MAC: (1) the default carrier sense mechanism can be turned off because software module relies on adaptive carrier sense mechanism and real-time Received Signal Strength Indicator ("RSSI") values from the hardware are used; and (2) the default 802.11 Acknowledge ("ACK") mechanism can be turned off and replaced with a delayed ACK to compensate for the indeterministic delays in the network.

In some embodiments of the present invention, the system 100 comprises a scheduling module 125. In some embodiments, the scheduling module 125 is configured to prevent each wireless radio in the first plurality of wireless radios 110, 111, 112, 113, and 114 from transmitting data packets when any other wireless radio in the first plurality of wireless radios 110, 111, 112, 113, and 114 is receiving data packets. In some embodiments, the scheduling module 125 can prevent the first node 105 from transmitting data packets to the second node 115 when the second node 115 is receiving data packets from a third node.

FIG. 6 provides exemplary pseudo code of a scheduling module in an exemplary embodiment of the present invention.

In some embodiments of the present invention, due to OOB emissions, it is not plausible for simultaneous transmissions and receptions to occur on different collocated wireless radios in a node. In some embodiments of the invention, it is, however, possible to either simultaneously transmit from all collocated radios or simultaneously receive on all collocated radios. In some embodiments, if a single node interacts with multiple other nodes at the same time, it can become difficult to schedule packets to/from those nodes (on different channels). Thus, in some embodiments, the scheduling module 125 can allow a node to interact with only one other node at any given time.

In some embodiments of the present invention, the scheduling module 125 has two primary functions. First, the scheduling module 125 can prevent transmission of data packets on any wireless radio in the first plurality of wireless radios 110, 111, 112, 113, and 114 if some of the radios in the first plurality of wireless radios 110, 111, 112, 113, and 114 are receiving packets. Second, the scheduling module 125 can prevent the transmission of packets to the second node 115 if the second node 115 is in conversation with a third node. To achieve this, in some embodiments of the present invention, the scheduling module 125 can opportunistically snoop on packets that it hears. These packets need not be destined to the first node 105. The addresses on the snooped packets can help the scheduling module 125 in determining if the intended destination is busy with some other communication, in which case packets should not be sent to the receiver. For example, the first node 105 may want to send a packet to a second node 115, but the first node 105 hears/snoops a packet that is transmitted from a third node and intended for the second node 115. In this case, the first node 105 can recognize that the second node 115 is busy with the third node, and the first node 105 will not attempt to transmit a data packet to the second node 115.

If it is not possible to snoop packets of an intended receiver (this may occur if the local node comprising the scheduling module 125 is out of reception range of the transmission but within the carrier sense range of the transmission), in some embodiments of the present invention, the first node 105 can depend on an adaptive carrier sensing module 130 to determine if a particular channel is free.

In conventional systems, the OOB emission from one wireless radio at a node can trigger unnecessary carrier sensing at another collocated wireless radio at the same node, thus preventing packet transmission on a radio if a collocated radio is already transmitting another packet. Therefore, in some embodiments of the present invention, the system 100 comprises an adaptive carrier sensing module 130. In some embodiments, the adaptive carrier sensing module 130 can estimate and account for the OOB emission power created by a first wireless radio 110 in the first plurality of wireless radios when the first wireless radio 110 is transmitting data packets. In some embodiments, the adaptive carrier sensing module 130 estimates and accounts for the OOB emission power by removing the estimated effect of OOB emission, due to transmission by the first wireless radio 110, from the received power of a second wireless radio 111 in the first plurality of wireless radios before determining if the received power in the second wireless radio 111 is greater than some threshold. Therefore, in some embodiments, the adaptive carrier sensing module 130 can determine whether a channel of each wireless radio in the first plurality of wireless radios is free by determining whether the received power is above a certain threshold after accounting for OOB emissions.

FIG. 7 provides exemplary pseudo code for a adaptive carrier sensing module 130 in an exemplary embodiment of the present invention.

In some embodiments where there are multiple collocated radios transmitting at the same time, the aggregate OOB effect of all the transmitting radios can be estimated and accounted for. For example, if a first wireless radio 110 and a second wireless radio 111 are transmitting data packets, the adaptive carrier sensing module 130 can remove the estimated effect of the OOB emissions from the first wireless radio 110 and the OOB emissions from the second wireless radio 111 from received power of a third wireless radio 112 before determining whether the received power at the third wireless radio 112 is above a certain threshold. Thus, it can be determined whether the third wireless radio 112 is free.

In some embodiments, the adaptive carrier sensing module 130 inserts a delay time between the start of a first data packet transmission from a first wireless radio 110 in the first plurality of wireless radios and the start of a second data packet transmission from the second wireless radio 111 in the first plurality of wireless radios.

In some embodiments of the present invention, the system 100 comprises an coarse synchronization module 135. In some embodiment of the present invention, the coarse synchronization module 135 ensures that all radios in a node begin to transmit data packets at the same time after physical carrier sense of their respective channels. In some embodiments of the present invention, the coarse synchronization module 135 ensures that a first data packet transmission, a second data packet transmission, and their acknowledgements occur within a predetermined epoch. An epoch is a time period during which a first node 105 transmits data packets to a second node 115 and waits for ACKs from the second node 115. In some embodiments, the coarse synchronization module 135 ensures that each data packet being received by the second node 115 ends simultaneously. In some embodiments, ACKs are sent by the second node 115 only after all packets in the epoch have been transmitted. This can prevent ACKs from corrupting receptions. In some embodiments of the present invention, ACKs are handled by a separate ACK handler.

For example, and not to be interpreted as limiting the invention, if the first node 105 is simultaneously transmitting two data packets to the second node 115 on two wireless channels, the coarse synchronization module 135 can ensure the each of the two data packets is finished being received by the second node 115 at the same time. Therefore, the second node 115 begins to transmit the first data packet ACK and second data packet ACK back to the first node 105 at the same time (the first data packet ACK on the first channel and the second data packet on the second channel). By ensuring that the first data packet ACK is not transmitted before the second data packet is finished being received by the second node 115, the coarse synchronization module 135 ensures that the first wireless radio 110 is not trying to receive the first data packet ACK while the second wireless radio 111 is still transmitting the second data packet (as discussed above, it is not desirable for one radio to transmit while a second collocated radio is receiving).

FIG. 8 provides exemplary pseudo code for a coarse synchronization module 135 in an exemplary embodiment of the present invention.

In some embodiments of the present invention, the system 100 comprises a framing module 140. In some embodiments, the framing module 140 can progressively decrease the size of each data packet being transmitted in successive data packet transmissions. There can be several possible sources of delay along a packet path in the network stack. In some embodiments, the delays that occur as a result of various bottlenecks along the network can be compensated. The delays can be split into two parts: (1) a constant deterministic delay ($\alpha$) and (2) a variable delay ($\beta$), which is not fully deterministic. The deterministic delay can occurs because of the system bus bottleneck. The $\beta$ delay can occur because of system inefficiencies. In some embodiments, a range of the $\beta$ delay can pre-computed, and this delay can be compensated by having an ACK timeout of maximum $\beta$ after the last packet is sent out. Also, in some embodiments, before handing out the packet to the radio, a second adaptive carrier sense is performed to determine if a new packet has started transmission during the time between the two adaptive carrier senses. If the second adaptive carrier sense indicates the presence of some new background carrier on a particular channel, the channel is not used for this epoch. To address delay in the systems, in some embodiments of the present invention, the framing module uses variable-sized data packets to accommodate multiple rates or for compensating for the delay.

For example, and not to be interpreted as limiting, consider the case where the first node 105 wants to simultaneously transmit a first data packet from a first wireless radio 110 at the first node 105 to a first wireless 120 at the second node 115 and transmit a second data packet from a second wireless radio 111 at the first node 105 to a second wireless radio 121 at the second node 115. There may be some delay between the start of the first data packet transmission and the second data packet transmission. In order to ensure that the first data packet and the second data packet are finished being received by the second node simultaneously, the data packets must be different sizes. Therefore, the framing module 140 can ensure that the second data packet is smaller than the first data packet such that the second node 115 finishes receiving the first and second data packets at the same time. So long as this occurs, the first data packet ACK and the second data packet ACK can be transmitted back simultaneously without encountering OOB emissions from any of the radios.

The presence of diversity of radios at source and destination nodes can be exploited to maximize the achievable aggregate throughput. As discussed above, when adjacent (yet orthogonal) channels are used simultaneously, imperfect filtering at the receiver radios can lead to packet errors during reception of packets. This error rate can depend on the location of the radio antenna, and even a small difference in location can lead to a huge improvement in aggregate throughput. The error rate, however, does not always change drastically during short intervals of time. When multiple channels are simultaneously being used, the error rate observed has some correlation with the RSSI observed at a particular receiver radio. In some embodiments of the present invention, the higher the RSSI values are at the receiver, the higher the throughput is at the radio.

If there are n radios at each of the source and destination nodes, then there are n!·n! possible combinations for assigning the n channels to different radios. In some embodiments of the present invention, it can be possible to find a combination that gives the best aggregate throughput. Therefore, in some embodiments of the present invention, the first node 105 comprises an efficiency module 145. In some embodiments, the efficiency module 145 can select a combination of adjacent channels used to transmit a first data packet and a second data, such that aggregate throughput of a wireless system is increased.

For example, consider a two radio wireless array. Table 1 provides the RSSI readings for the two receiver radios and their corresponding aggregate throughputs (no carrier sense and no ACK) for the four different combinations of radio-channel associations when both the transmit radios are simultaneously transmitting packets, in an exemplary embodiment of the present invention. From Table 1, it can be observed that combination 3 performs the best in terms of the aggregate throughput. Combination 3 also has the highest aggregate RSSI. Hence, in some embodiments of the present invention, the sum of RSSI of all receive radios, when all the transmit radios are active, can be used by the efficiency module 145 as a metric to determine the best combination of channels to use when transmitting data packets on multiple channels.

TABLE 1

RSSI and Aggregate Throughput for Different Combinations of Radio-Channel Association for a Two Radio Wi-Fi Array

| Combination # | Receive RSSI | Throughput (Mbps) |
| --- | --- | --- |
| 1 | 34, 36 | 70.1 |
| 2 | 31, 40 | 65.2 |
| 3 | 41, 38 | 78.2 |
| 4 | 33, 31 | 60.1 |

As the number of radios in each node increases, the number of possible channels increases. Even though the efficiency module's 145 search space is very large when determining a more efficient channel combination, a significantly smaller number of experiments are sufficient to make the RSSI measurements. In some embodiments of the present invention, the efficiency module 140 uses the fact that simultaneous transmissions using only adjacent channels affect the achievable throughput on any channel to reduce the number of experiments required to make the RSSI measurements. In an exemplary embodiment, at the transmit node, multiple radios can be simultaneously activated (simultaneous activation can be referred to as sending data packets on multiple radios at the same time after turning off default carrier sensing and ACKs) using adjacent channels. There, the RSSI measurement can be made for the middle channel on each of the n receive radios. In some embodiments, this single experiment can give 'n' RSSI readings for a particular combination of channel (the middle channel), transmit radio (radio at transmit node using the middle channel), and the receive radio. In some embodiments of the present invention, hanging the multiple channels of activation and the transmit radio for the central channel leads to a total of n$^2$ experiments. In some embodiments, it is possible to determine all the required RSSI values from these experiments to compute the metric used by the efficiency module 140 to determine the best combination. In an exemplary embodiment, the metric used can be the sum of RSSI readings. This exemplary metric is provides a combination that shows a high achievable aggregate throughput. In an exemplary embodiment of the present invention, the efficiency module 145 uses a simple brute force search algorithm. The scope of the invention is not, however, limited to using a search algorithm. Those of ordinary skill in the art will understand that there are several algorithms for traversing the RSSI readings to determine the most efficient combination of channels. In some embodiments of the present invention, once a suitable radio-channel association is selected, it can be used as long as the RSSI values at the receiver do not change significantly. The RSSI values, however, in some embodiments of the invention, can change if channel conditions have changed because of mobility or time of operation.

In some embodiments, if a particular wireless radio of the first node 105 senses its channel to be busy, it will not send any packet during that epoch. In some embodiments, if some of the data packets are not received during an epoch, they are retransmitted during the next epoch. In some embodiments, the retransmission can happen through a different radio than the one in which the packet was sent around the first time. In an exemplary embodiment, the first node 105 performs a random backoff, similar to the random backoff in 802.11 MAC, to provide fairness across all nodes occupying the channels. In some embodiments, however, there is only a single backoff for all radios. This can ensure coarse synchronization across all the radios.

In some embodiments of the present invention having a single backoff for all channels, it is possible for the system to be unfair across users. If there are multiple users on a particular channel, packets belonging to the different users can collide with each other. An unsuccessful ACK will indicate such a loss of packet. Ideally in such a scenario, the transmitters should backoff for a larger time on that particular channel during the next packet transmission. However, because all radios in a node can have a single backoff, it may be difficult to have a larger backoff for a particular radio. Therefore, in some embodiments of the present invention, compensation is provided by not sending any packet in some epochs.

In some embodiments of the present invention, individual radios are allowed to have their own rate control algorithm. In some embodiments, however, because the default 802.11 ACK is turned off, the driver, which can perform the rate control, does not have access to the successful packet delivery information; instead, the system 100 can comprise an ACK handler sends this information to the driver. In some embodiments, after every packet transmission on a radio, the corresponding driver can be given the information whether the transmission was successful or not. This information can be used by the driver to perform rate control.

In some embodiments of the present invention, while using a wireless array, channel conditions may vary across different channels being used. In some embodiments, depending on the channel conditions, different rates of data transmission may be required for different radios to ensure successful reception of the packets. Different rates, however, can imply different transmit times for packets with the same length. Therefore, when only one packet is sent across a radio in a single epoch, a slower radio can prevent faster radios from transmitting new packets. Thus, in some embodiments, a slow radio in a wireless array can pull down the aggregate throughput achievable out of the wireless array. Therefore, some embodiments of the present invention having different radios with different rates can use different packet sizes so that the transmit time for any packet is the same and wastage can be avoided. In some embodiments of the invention, all packets from a higher layer can be joined to form a single byte stream. In some embodiments, suitable sized frames can be created from this stream and given to individual radios. In some embodiments of the present invention, this variable size framing can also be used to compensate the delays in packet transmission across radios.

In some embodiments of the present invention, the aggregate throughput of data transmitted from the first node 105 to the second node 115 using multiple channels can exceed 70% of the sum of the default individual throughputs of each channel. The default individual throughput of each channel can mean the capable throughput of each channel when the first node and second node are off-the-shelf nodes, before being improved upon with embodiments of the present invention. For example, if a first node 105 and second node 115 can communicate with three different orthogonal channels each having a default individual data rates of about 40 Mbps when acting alone, then some embodiments of the present invention allow data to be transmitted from the first node 105 to the second node 115 using all three channels simultaneously at a rate of at least about 84 Mbps (40 Mbps×3 channels×70%=84 Mbps). In some embodiments of the present invention, the aggregate throughput of data transmitted from the first node 105 to the second node 115 using multiple channels can exceed 80% of the sum of the default individual throughputs of each channel. In some embodiments of the present invention, the aggregate throughput of data transmitted from the first node 105 to the second node 115 using multiple channels can exceed 90% of the sum of the default individual throughputs of each channel. In some embodiments of the present invention, the aggregate throughput of data transmitted from the first node 105 to the second node 115 using multiple channels can exceed 94% of the sum of the default individual throughputs of each channel.

Figure 13:
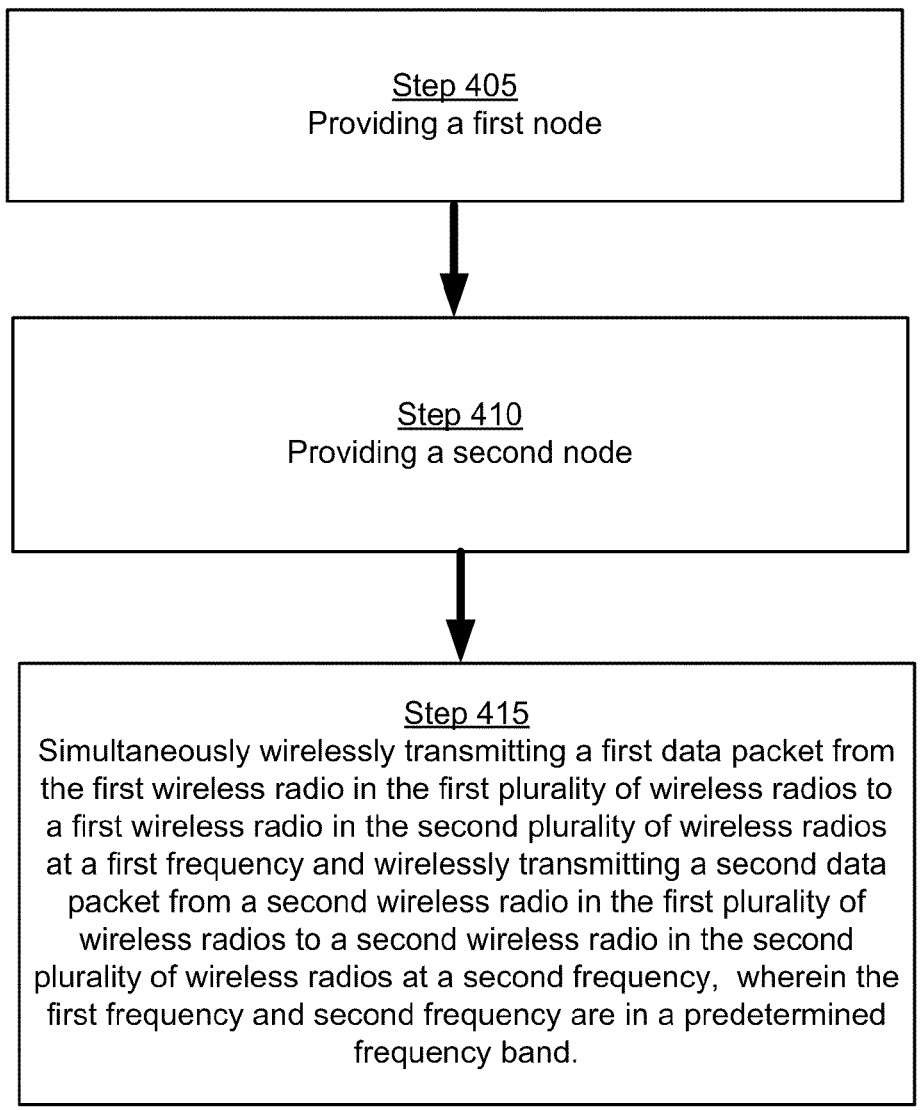
FIG. 13 provides a flow chart of an exemplary method 400 for increasing aggregate throughput in a wireless network array.

In addition to systems for increasing the aggregate throughput in a wireless network array, the present invention also provides methods of increasing aggregate throughput in a wireless network array. FIG. 13 provides a flow chart of an exemplary method 400 for increasing aggregate throughput in a wireless network array. The exemplary method 400 comprises providing a first node 405 having a first plurality of wireless radios 110, 111, 112, 113, and 114, providing a second node 410 having a second plurality of wireless radios 120, 121, 122, 123, and 124, and simultaneously wirelessly transmitting a first data packet from a first wireless radio 110 in the first plurality of wireless radios to a first wireless radio 120 in the second plurality of wireless radios at a first frequency and wirelessly transmitting a second data packet from a second wireless radio 111 in the first plurality of wireless radios to a second wireless radio 121 in the second plurality of wireless radios at a second frequency 415. In another exemplary embodiment, the first node 105 can further simultaneously wirelessly transmit a third data packet from a third wireless radio 112 in the first plurality of wireless radios to a third wireless radio 122 in the second plurality of wireless radios at a third frequency. In yet another exemplary embodiment, the first node 105 can simultaneously transmit up to a number of data packets equal to the number of wireless radios in the first plurality of wireless radios. In some embodiments of the present invention, the first frequency and the second frequency are in a predetermined frequency band. In an exemplary embodiment of the method 400, the first frequency and second frequency are in the 2.4 GHz frequency band. In yet another exemplary embodiment of the method 400, the first and second frequency are in the 5.2 GHz frequency band. In still yet another embodiment of the method 400, the first frequency and the second frequency are any one of the following frequency bands, including, but not limited to, the High Frequency ("HF") band, the Very High Frequency ("VHF") band, the Ultra High Frequency ("UHF") band, the Long wave ("L") band, the Short wave ("S") band, the C band, the X band, the Kurz-Under ("$K_u$") band, the Kurz ("K") band the Kurz-Above ("$K_a$") band, the "V" band the "W" band, the millimeter ("mm") band, and similar frequency bands. In still yet another embodiment of the system 100, the second frequency is between 80% and 120% of the first frequency, but the second frequency is not equal to the first frequency. In even still yet another exemplary embodiment of the system 100, the second frequency is between 90% and 110% of the first frequency, but the second frequency is not equal to the first frequency.

In an exemplary embodiment of the method 400, the first node 105 comprises a scheduling module 125. In some embodiments, the scheduling module 125 is configured to prevent each radio in the first plurality of wireless radios 110, 111, 112, 113, and 114 from transmitting data packets when any other wireless radio in the first plurality of wireless radios 110, 111, 112, 113, and 114 is receiving data packets. In some embodiments, the scheduling module 125 can prevent the first node 105 from transmitting data packets to the second node 115 when the second node 115 is receiving data packets from a third node.

In another exemplary embodiment of the method 400, the first node 105 comprises a coarse synchronization module 135. In some embodiments, the coarse synchronization module 135 can ensure that at least a first data packet transmission, a second data packet transmission, and acknowledgements occur within a predetermined epoch.

In yet another exemplary embodiment of the method 400, the first node comprises a framing module 140. In some embodiments, the framing module 140 can progressively decrease the size of each data packet being transmitted in successive data packet transmissions.

In still yet another exemplary embodiment of the method 400, the first node 105 comprises an adaptive carrier sensing module 130. In some embodiments, the adaptive carrier sensing module 130 can estimate and account for the out-of-band emission power created by a first wireless radio 110 in the first plurality of wireless radios 110, 111, 112, 113, and 114 when the first wireless radio 110 is transmitting data packets. In some embodiments, the adaptive carrier sensing module 130 inserts a delay time between the start of a first data packet transmission from a first wireless radio 110 in the first plurality of wireless radios 110, 111, 112, 113, and 114 and the start of a second data packet transmission from the second wireless radio 111 in the first plurality of wireless radios 110, 111, 112, 113, and 114. In some embodiments, the adaptive carrier sensing module 130 can determine whether a channel of each wireless radio in the first plurality of wireless radios 110, 111, 112, 113, and 114 is free.

In another exemplary embodiment of the method 400, the first node 105 comprises an efficiency module 145. In some embodiments, the efficiency module 145 can select a combination of adjacent channels used to transmit a first data packet and a second data packet, such that aggregate throughput of a wireless system is increased.

In some embodiments of the present invention, the various modules described herein, including, but not limited to, the scheduling module 125, the adaptive carrier sensing module 130, the coarse synchronization module 135, the framing module 140, the efficiency module 145, and the software module 500, can each be implemented with a processor and memory. Further, in some embodiments, the various modules can be implemented on integrated circuit boards.

Exemplary scenarios illustrating the functionality of exemplary embodiments of the system 100 are now presented. These exemplary scenarios are intended solely to illustrate operation of the various embodiments of the system 100 and method 400 for increasing aggregated throughput in a wireless network array and should not be interpreted as limiting the scope of the present invention. In the first exemplary scenario, a node A wants to talk to another node B. There are no other interfering sources. At node A, the exemplary embodiment of the system 100 can get data packets from the higher layer, put them all in a single byte stream, create packets of variable sizes for different radios, and hand over packets to the corresponding radios. Because, in this scenario, there are no other transmissions in the vicinity, every radio will sense the channel to be free. Each radio can send the data packets during the epoch. At the end of the epoch, the receiver node can send ACKs on each radio if the corresponding packet was received successfully. If some packets are lost during the epoch, those packets are re-transmitted during the next epoch. Retransmission can take place on a new radio.

In the second exemplary scenario, several nodes contend with each other to transmit data packets. Because an exemplary embodiment of the system 100 can use a single backoff for all radios in the at the node, and because all the radios are virtually glued together, there should ideally be a single virtual channel with multiple contending nodes (as in a single channel 802.11 network). However, because there is only a coarse synchronization across radios and there is a finite delay between the start of packets on each radio, different nodes might take over control of different channels during an epoch. This will result in an epoch where each of the transmit nodes use a subset of all the available channels. If the destination nodes of each of the transmitting nodes is different, then the exemplary embodiment of the system can essentially result in a situation with multiple links operating at the same time with each link operating on a subset of the channels. On the other hand, consider a situation where two nodes A and B want to talk to the same destination node C. Because nodes A and B have different random backoffs, they will likely start at a different time instants, and, hence, only one of them takes over all the channels. Additionally, it is possible that before all radios of the node that first start its transmission, the other node might start its own transmission. In this case, there can be two possible cases. First, if the node B opportunistically snoops the packets of the node A, the scheduling module 125 may not allow node B to talk to node C. Second, if opportunistic snooping is not possible, however, both nodes A and B can go ahead and send packets on different channels. Node C may only send ACKs for packets belonging to the node A and ignore all packets from the node B.

In the third exemplary scenario, there are background 802.11 transmissions on some of the channels that are being used by a pair of nodes. Because of the random backoff, the channels with the background traffic can be shared between the corresponding radios of the nodes and the background 802.11 traffic. As discussed above, the radios of the transmit node may not use a channel if it is already being used by some other traffic. It is, however, possible that OOB emissions mask the background carrier, and ACS fails. In such a situation, packets can collide on the particular channel at the receiver radios. This can result in a lost packet. The lost packets can then be retransmitted at a later time.

In the fourth exemplary scenario, a node A wants to interact with both another node B and a single-radio node C. The scheduling module 125 can ensure that only one of links (A with B or A with C) is active at any given time. There can be four resulting situations depending on the direction of communication between the A-B and A-C pairs. First, if node A is transmitting to node B and node C, then node A will either transmit an epoch of packets to node B or transmit a single packet to node C. Second, now consider the situation when node A wants to send packets to node B and node A has to receive from node C. In this case, when node C is sending some packet to node A, the scheduling module 125 can ensure that no packet is transmitted from node A. Similarly, when node A is transmitting packets, node C can simply backoff because it sees a packet in its channel. Third, consider the situation of when node B sends to node A and node A sends to node C. In this situation, when node B sends an epoch of packets to node A, the scheduling module 125 can prevent packets from being sent from node A to node C. Similarly, when node A is sending a packet to node C, node B can opportunistically hear the packet and refrain from sending the epoch of packets to node A. Fourth, consider the situation when both node B and node C try to send packets to node A. In this case, node B might not be able to opportunistically snoop node C's packets if they are out of transmitting range of each other. Additionally, node C and node B might be able to detect the other with carrier sense (physical or adaptive) or else packets will collide on the channels and will be simply re-transmitted at a later time.

Figure 9A:
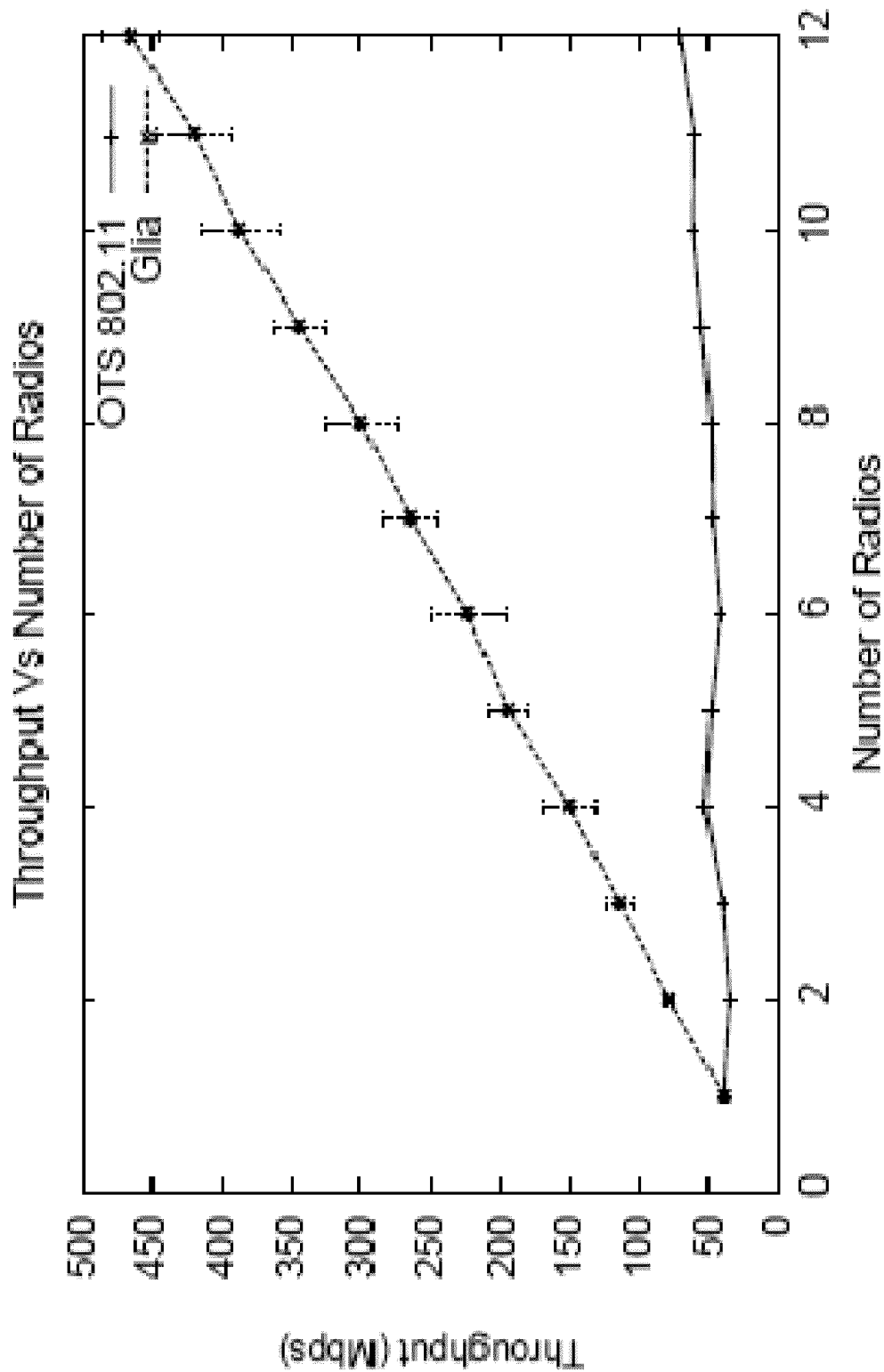
FIG. 9A provides a comparison of the throughput of and exemplary embodiment of the present invention (Glia) with a conventional system (OTS 802.11).
Figure 9B:
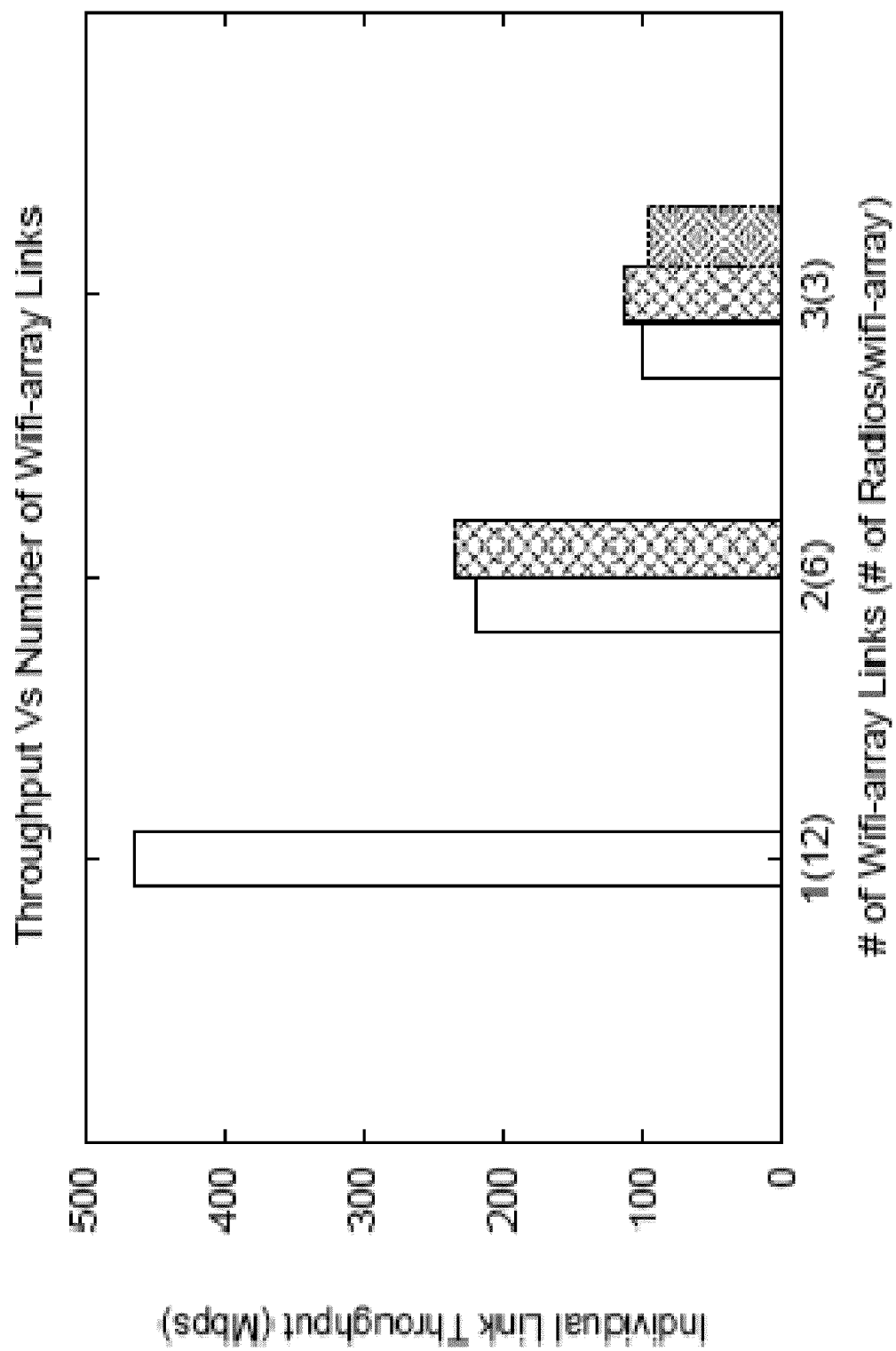
FIG. 9B illustrates the throughput of exemplary embodiments of the present invention in the presence of multiple wireless links.
Figure 9C:
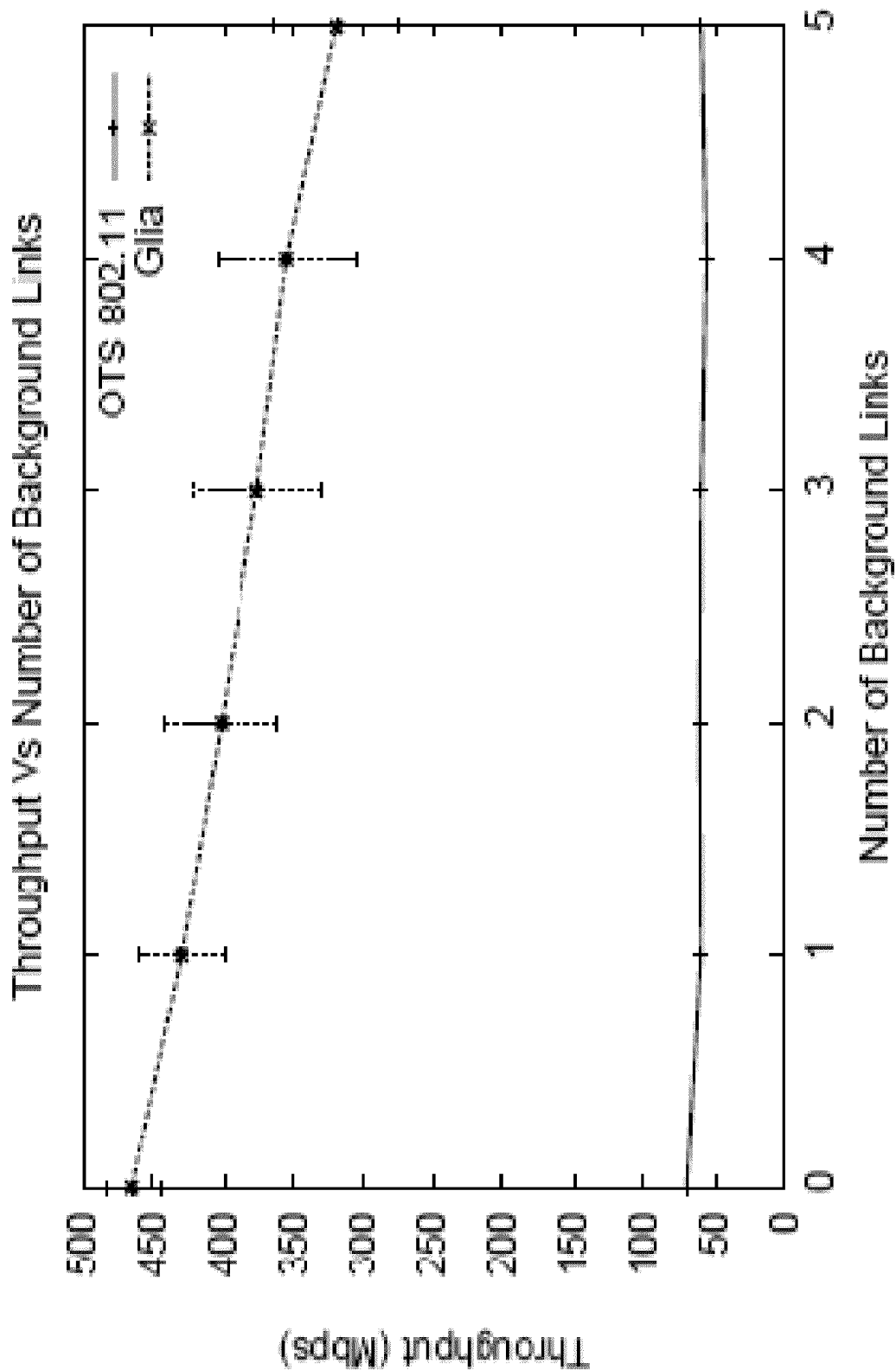
FIG. 9C provides the throughput of an exemplary embodiment of the present invention with a varied number of background links.
Figure 10:
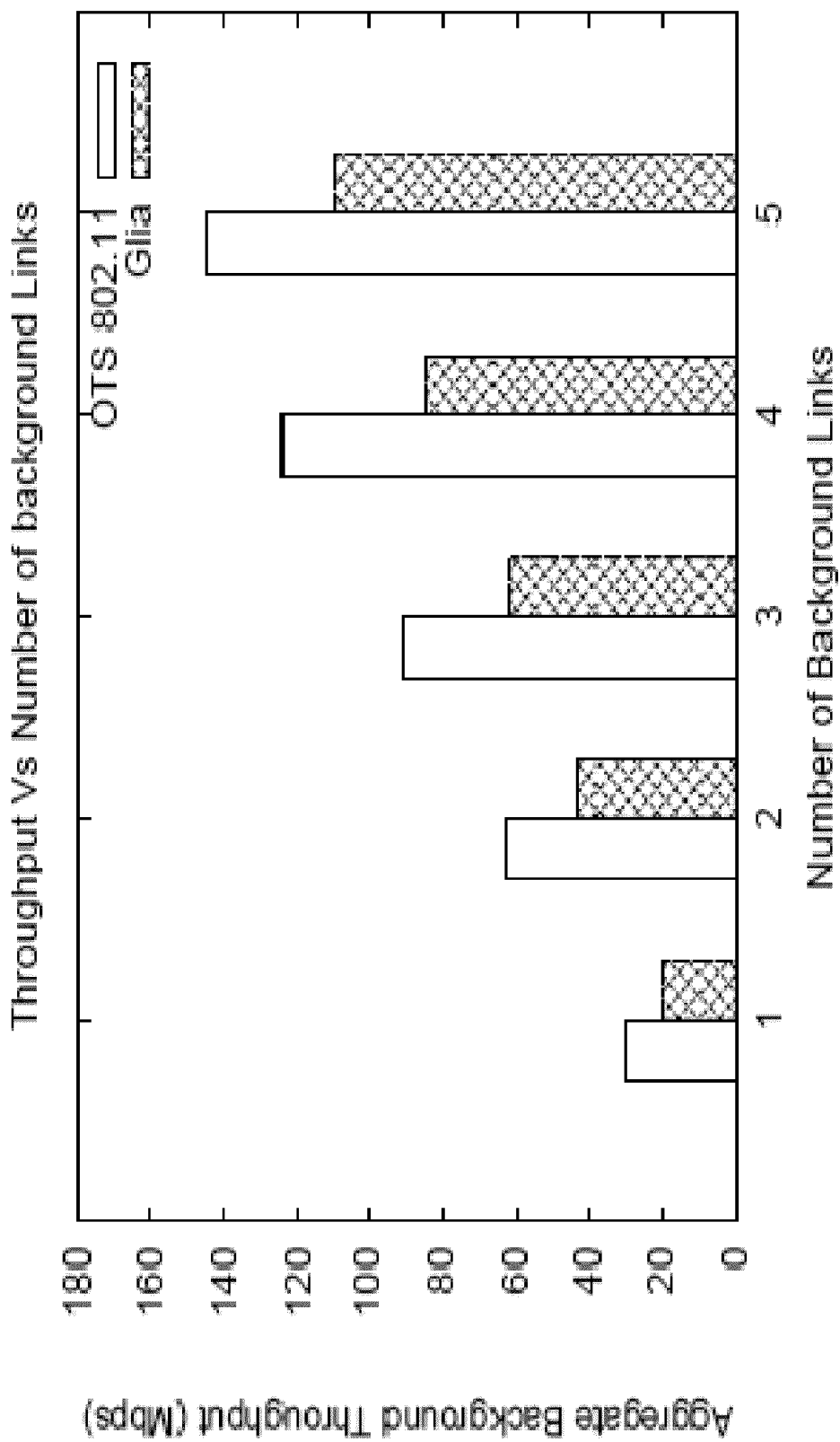
FIG. 10 provides a comparison of the aggregate background link throughput in a conventional system (OTS 802.11) and an exemplary embodiment of the present invention (Glia).
Figure 11A:
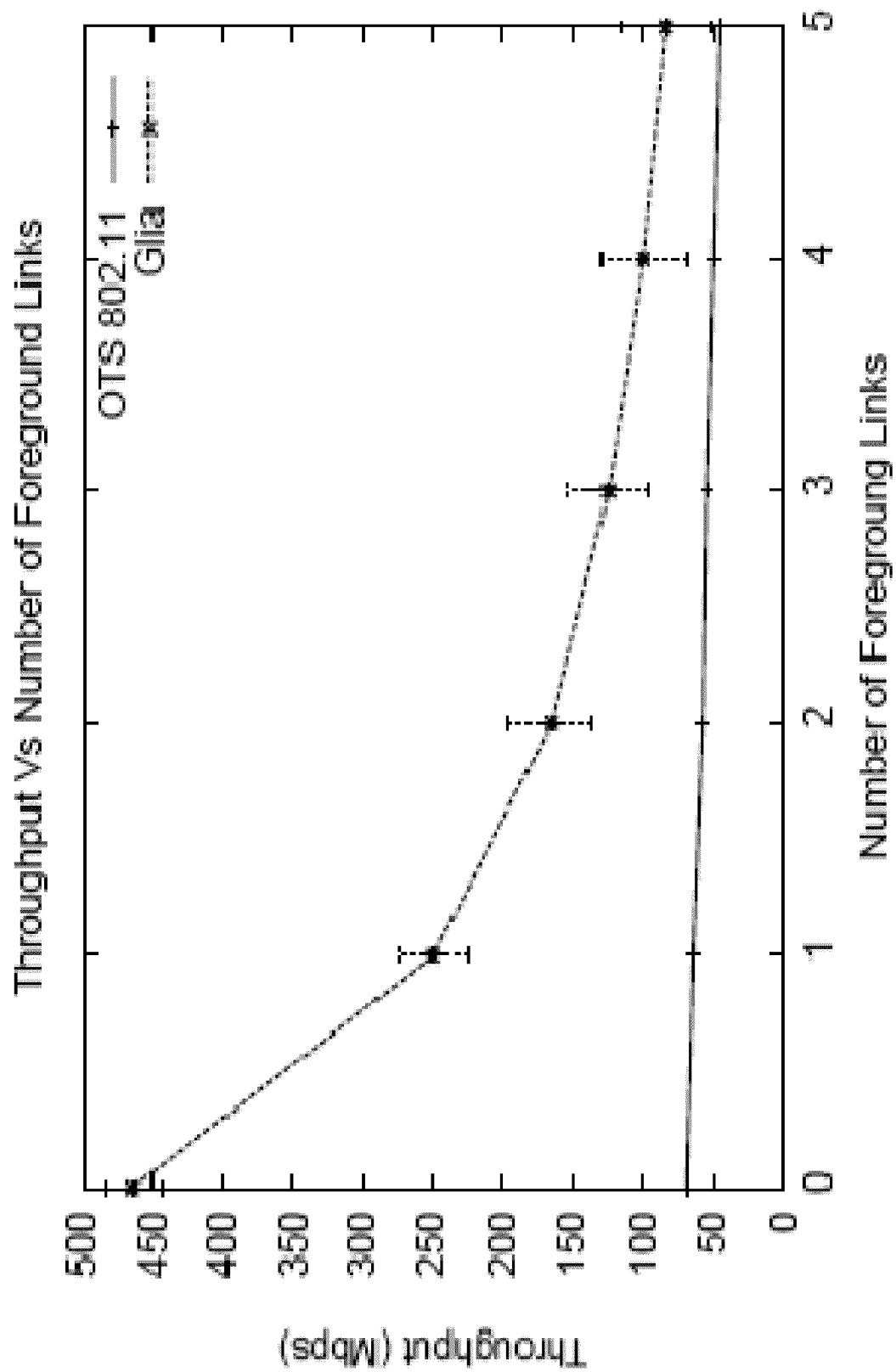
FIG. 11A provides a comparison of the throughput versus the number of foreground links between a conventional system (OTS 802.11) and an exemplary embodiment of the present invention (Glia).
Figure 11B:
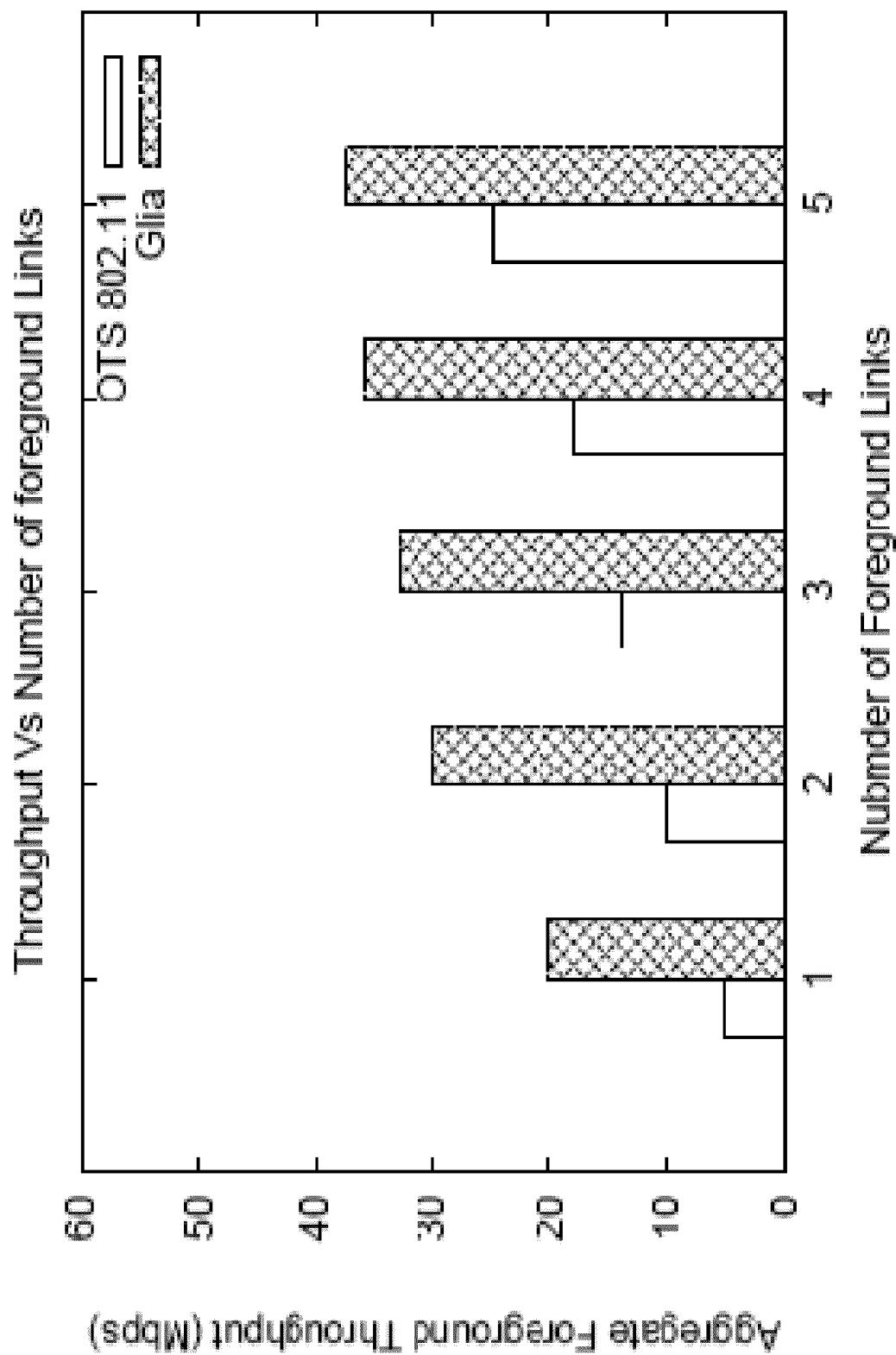
FIG. 11B provides a comparison of the aggregate foreground throughput between a conventional system (OTS 802.11) and an exemplary embodiment of the present invention (Glia).
Figure 11C:
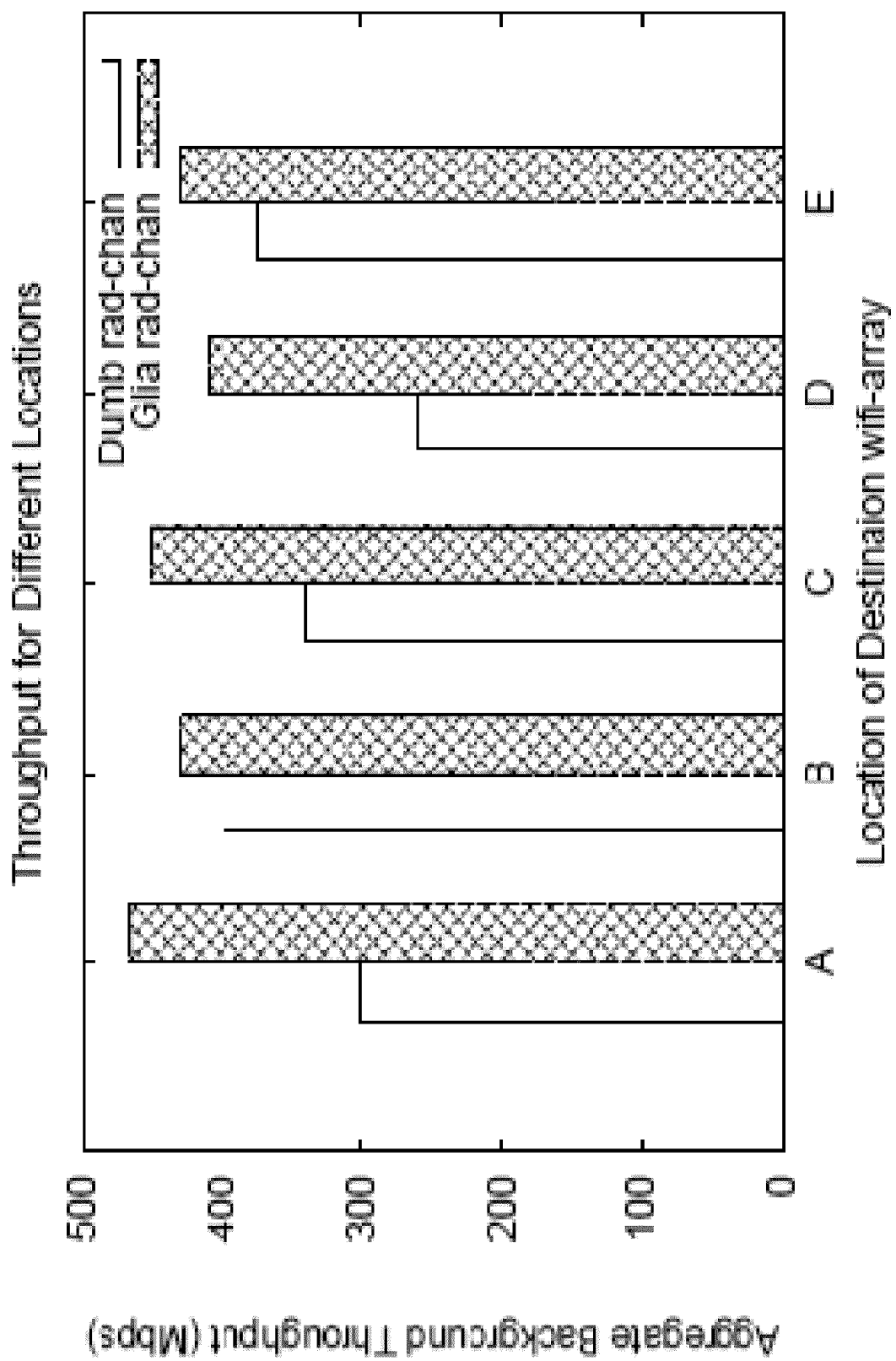
FIG. 11C provides a comparison of the aggregate background throughput between a system employing a conventional radio channel association (Dumb rad-chan) and a system employing an efficiency module of the present invention (Glia rad-chan).
Figure 12:
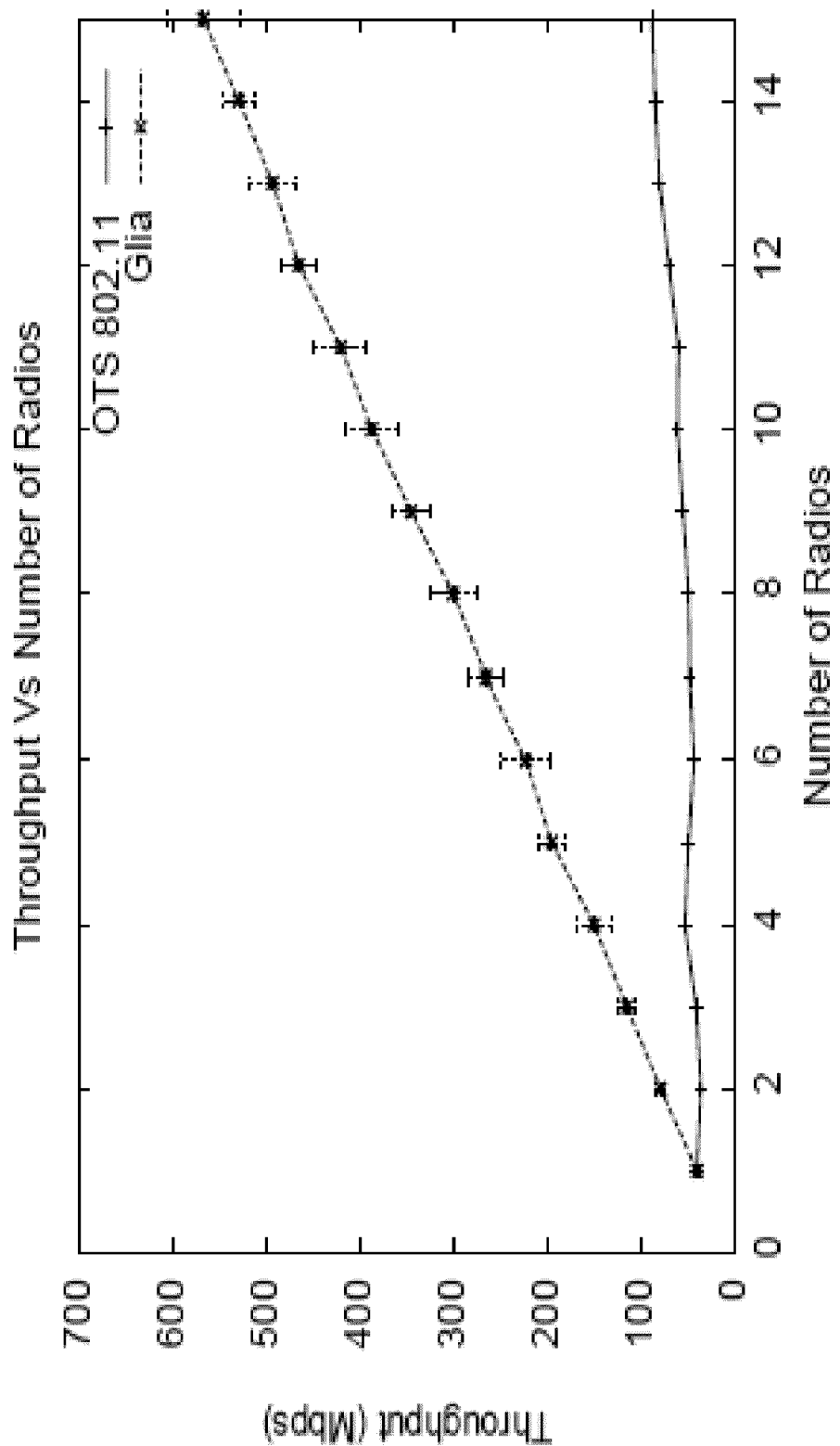
FIG. 12 provides a comparison of the aggregate throughput between a conventional system (OTS 802.11) and an exemplary embodiment of the present invention employing 15 channels, three in the 2.4 GHz band and 12 in the 5.2 GHz band.

The various embodiments of the systems 100 and methods 400 of the present invention provide significant improvement over the conventional systems and methods. FIG. 9A provides a comparison of the throughput of and exemplary embodiment of the present invention (Glia) with a conventional system (OTS 802.11). From FIG. 9A, it is clear that the throughput of the exemplary embodiment of the present invention increases linearly as the number of radios being used increases while the throughput of the conventional system remains relatively constant as the number of radios is increased. FIG. 9B illustrates the throughput of exemplary embodiments of the present invention in the presence of multiple wireless links. FIG. 9C provides the throughput of an exemplary embodiment of the present invention with a varied number of background links. FIG. 10 provides a comparison of the aggregate background link throughput in a conventional system (OTS 802.11) and an exemplary embodiment of the present invention (Glia). FIG. 11A provides a comparison of the throughput versus the number of foreground links between a conventional system (OTS 802.11) and an exemplary embodiment of the present invention (Glia). FIG. 11B provides a comparison of the aggregate foreground throughput between a conventional system (OTS 802.11) and an exemplary embodiment of the present invention (Glia). From FIGS. 11A and 11B, it is clear that the exemplary embodiment continually out-performs the conventional system. FIG. 11C provides a comparison of the aggregate background throughput between a system employing a conventional radio channel association (Dumb rad-chan) and a system employing an efficiency module 145 of the present invention (Glia rad-chan). FIG. 12 provides a comparison of the aggregate throughput between a conventional system (OTS 802.11) and an exemplary embodiment of the present invention employing 15 channels, three in the 2.4 GHz band and 12 in the 5.2 GHz band. From FIG. 12, it is clear that the exemplary embodiment of the present invention outperforms the conventional system with 15 radios by a factor of almost six.

Table 2 provides a comparison of the aggregate throughput between a conventional system and an exemplary embodiment of the present invention that comprises a framing module 140 when both systems are using radios with different rates. The conventional system, which lacks a framing module 140, uses constant packet sizes. On the other hand, the exemplary embodiment of the present invention, which includes a framing module 140, uses variable packet sizes. It is clear from Table 2 that the exemplary embodiment using variable packet sizes has much higher throughputs than the conventional system using constant packet sizes.

TABLE 2

Aggregate Throughput for Different Data-Rates (Mbps)

| Rates | Const. Pkt. | Var. Pkt. |
|---|---|---|
| 54, 6 | 10 | 43.1 |
| 54, 48 | 72 | 75.1 |
| 36, 12 | 18 | 37.8 |
| 12, 6 | 12 | 16 |

Table 3 provides a comparison of the aggregate throughput between a conventional system (802.11) and an exemplary embodiment of the present invention (Glia) when the two systems use three channels in the 2.4 GHz band. The aggregate throughputs for each system are provided in the frequency band is busy with outside users (12:00 pm) and when the frequency band is not busy with outside users (12:00 am). It is clear from Table 3, that the exemplary embodiment of the present invention achieves much higher throughputs compared to the conventional system.

TABLE 3

Exemplary Embodiment (Glia) in 2.4 GHz Band

| Scenario/Channels | Aggregate (Mbps) |
|---|---|
| 802.11 (12:00 pm) | 20 |
| Glia (12:00 pm) | 55 |
| 802.11 (12:00 am) | 34 |
| Glia (12:00 am) | 95 |

Table 4 provides a comparison of the aggregate throughput between a conventional system (Default Two-Radio) and an exemplary embodiment of the present invention (Partial Glia) when the two systems employ two channels using 802.11n standards. It is clear from Table 4 that the exemplary embodiment outperforms the conventional systems.

TABLE 4

Aggregate Throughput for Collocated 802.11n Radios

| Scenario/Channels | Aggregate (Mbps) |
|---|---|
| Ideal Two-Radio | 192 |
| Default Two-Radio | 81 |
| Partial Glia | 132 |

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. It is intended that the application is defined by the claims appended hereto.

What is claimed is:

1. A system for increasing aggregate throughput in a wireless network array comprising:
   a first node comprising:
      a first plurality of wireless radios;
      a processor; and
      a memory comprising instructions that, when executed by the processor, are configured to:
         prevent each radio in the first plurality of wireless radios from transmitting data packets when any wireless radio in the first plurality of wireless radios is receiving data packets;
         estimate an effect of out-of-band emission power created by a first wireless radio in the first plurality of wireless radios when the first wireless radio is transmitting data packets; and
         remove the estimated effect of out-of-band emission power created by the first wireless radio from a received power of a second wireless radio in the first plurality of wireless radios before determining if the received power in the second wireless radio is greater than a threshold, wherein when the received power is above the threshold, the processor determines the channel is free; and
         progressively decrease the size of each data packet being transmitted in successive data packet transmissions; and
   a second node having a second plurality of wireless radios, wherein the first node is configured to simultaneously wirelessly transmit a first data packet from the first wireless radio in the first plurality of wireless radios to a first wireless radio in the second plurality of wireless radios at a first frequency and wirelessly transmit a second data packet from a second wireless radio in the first plurality of wireless radios to a second wireless radio in the second plurality of wireless radios at a second frequency, wherein the first frequency and second frequency are in a predetermined frequency band.

2. The system of claim 1, wherein the memory further comprises instructions that, when executed by the processor, are configured to insert a delay time between the start of the first data packet transmission from the first wireless radio in the first plurality of wireless radios and the start of the second data packet transmission from the second wireless radio in the first plurality of wireless radios.

3. The system of claim 1, wherein the memory further comprises instructions that, when executed by the processor, are configured to ensure that the first data packet transmission, the second data packet transmission, and acknowledgements occur within a predetermined epoch.

4. The system of claim 1, wherein the memory further comprises instructions that, when executed by the processor, are configured to select a combination of adjacent channels used to transmit the first and second data packets such that aggregate throughput of the system is increased.

5. The system of claim 1, wherein the memory further comprises instructions that, when executed by the processor, are configured to prevent the first node from transmitting data packets to the second node when the second node is receiving data packets from a third node.

6. The system of claim 1, wherein the memory further comprises instructions that, when executed by the processor, are configured to determine whether a channel of each wireless radio in the first plurality of wireless radios is free.

7. The system of claim 1, wherein the aggregate throughput of data transmitted from the first node to the second node exceeds 70% of the sum of the default individual throughputs of each channel used to transmit data.

8. A system for increasing aggregate throughput in a wireless network array comprising:
   a first node comprising:
      a first plurality of wireless radios;
      a processor; and
      a memory comprising instructions that, when executed by the processor, are configured to:
         prevent each radio in the first plurality of wireless radios from transmitting data packets when any wireless radio in the first plurality of wireless radios is receiving data packets;
         ensure that successive data packet transmissions and acknowledgements occur within a predetermined epoch; and
         progressively decrease the size of each data packet being transmitted in the successive data packet transmissions;
         estimate an effect of out-of-band emission power created by a first wireless radio in the first plurality of wireless radios when the first wireless radio is transmitting data packets; and
         remove the estimated effect of out-of-band emission power created by the first wireless radio from a received power of a second wireless radio in the first plurality of wireless radios before determining if the received power of the second wireless radio is greater than a threshold, wherein when the received power is above the threshold, the processor determines the channel is free; and
   a second node having a second plurality of wireless radios, wherein the first node is configured to simultaneously wirelessly transmit a first data packet from the first wireless radio in the first plurality of wireless radios to a first wireless radio in the second plurality of wireless radios at a first frequency and wirelessly transmit a second data packet from a second wireless radio in the first plurality of wireless radios to a second wireless radio in the second plurality of wireless radios at a second frequency, wherein the first frequency and second frequency are in a predetermined frequency band.

9. The system of claim 8, wherein the memory further comprises instructions that, when executed by the processor, are configured to insert a delay time between the start of the first data packet transmission from the first wireless radio in the first plurality of wireless radios and the start of the second data packet transmission from the second wireless radio in the first plurality of wireless radios.

10. The system of claim 8, wherein the memory further comprises instructions that, when executed by the processor, are configured to determine whether a channel of each wireless radio in the first plurality of wireless radios is free.

11. The system of claim 8, wherein the memory further comprises instructions that, when executed by the processor, are configured to select a combination of adjacent channels used to transmit data packets such that aggregate throughput of the system is increased.

12. The system of claim 8, wherein the memory further comprises instructions that, when executed by the processor, are configured to prevent the first node from transmitting data packets to the second node when the second node is receiving data packets from a third node.

13. The system of claim 8, wherein the aggregate throughput of data transmitted from the first node to the second node exceeds 70% of the sum of the default individual throughputs of each channel used to transmit data.

14. A method of increasing aggregate throughput in a wireless network array, the method comprising:
providing a first node, the first node comprising;
a first plurality of wireless radios;
a processor; and
a memory comprising instructions that, when executed by the processor, are configured to:
prevent each radio in the first plurality of wireless radios from transmitting data packets when any wireless radio in the first plurality of wireless radios is receiving data packets;
ensure that successive data packet transmissions and acknowledgements occur within a predetermined epoch;
progressively decrease the size of each data packet being transmitted in the successive data packet transmissions; and
estimate an effect of out-of-band emission power created by a first wireless radio in the first plurality of wireless radios when the first wireless radio is transmitting data packets; and
remove the estimated effect of out-of-band emission power created by the first wireless radio from a received power of a second wireless radio in the first plurality of wireless radios before determining if the received power of the second wireless radio is greater than a threshold, wherein when the received power is above the threshold, the processor determines the channel is free;
providing a second node having a plurality of wireless radios; and
simultaneously wirelessly transmitting a first data packet from the first wireless radio in the first plurality of wireless radios to a first wireless radio in the second plurality of wireless radios at a first frequency and wirelessly transmitting a second data packet from a second wireless radio in the first plurality of wireless radios to a second wireless radio in the second plurality of wireless radios at a second frequency, wherein the first frequency and second frequency are in a predetermined frequency band.

15. The method of claim 14, wherein the memory further comprises instructions that, when executed by the processor, are configured to insert a delay time between the start of the first data packet transmission from the first wireless radio in the first plurality of wireless radios and the start of the second data packet transmission from the second wireless radio in the first plurality of wireless radios.

16. The method of claim 14, wherein the memory further comprises instructions that, when executed by the processor, are configured to prevent the first node from transmitting data packets to the second node when the second node is receiving data packets from a third node.

17. The method of claim 14, wherein the aggregate throughput of data transmitted from the first node to the second node exceeds 70% of the sum of the default individual throughputs of each channel used to transmit data.

\* \* \* \* \*